(12) United States Patent
Kwon

(10) Patent No.: US 7,607,116 B2
(45) Date of Patent: Oct. 20, 2009

(54) METHOD AND APPARATUS FOR VERIFYING SYSTEM-ON-CHIP MODEL

(75) Inventor: Soon-Wan Kwon, Gwangju-si (KR)

(73) Assignee: Samsung Electronics Co., Ltd (KR)

( * ) Notice: Subject to any disclaimer, the term of this patent is extended or adjusted under 35 U.S.C. 154(b) by 110 days.

(21) Appl. No.: 11/965,504

(22) Filed: Dec. 27, 2007

(65) Prior Publication Data

US 2008/0163143 A1 Jul. 3, 2008

(30) Foreign Application Priority Data

Dec. 30, 2006 (KR) .................. 10-2006-0139212

(51) Int. Cl.
*G06F 17/50* (2006.01)
(52) U.S. Cl. .................. 716/5; 716/4; 716/6; 703/1
(58) Field of Classification Search ............ 716/4–6; 703/1
See application file for complete search history.

(56) References Cited

U.S. PATENT DOCUMENTS

2006/0282233 A1* 12/2006 Pasricha et al. .............. 703/1
2008/0263486 A1* 10/2008 Alexanian et al. ............ 716/5

* cited by examiner

*Primary Examiner*—Naum B Levin
(74) *Attorney, Agent, or Firm*—The Farrell Law Firm, LLP

(57) ABSTRACT

A method for performing verification on a Transaction Level (TL) model having at least two abstraction levels in simulation modeling for design of a System-on-Chip (SoC). The TL model verification method includes acquiring first request information and first response information; acquiring second request information and second response information; dividing the first and second request information and the first and second response information; comparing the divided first and second request information and comparing the divided first and second response information; and verifying a modeling result on the TL model depending on the comparison results.

15 Claims, 19 Drawing Sheets

METHOD AND APPARATUS FOR VERIFYING SYSTEM-ON-CHIP MODEL

PRIORITY

This application claims priority under 35 U.S.C. § 119(a) to a Korean Patent Application filed in the Korean Intellectual Property Office on Dec. 30, 2006 and assigned Serial No. 2006-139212, the disclosure of which is incorporated herein by reference.

BACKGROUND OF THE INVENTION

1. Field of the Invention

The present invention relates generally to System-on-Chip (SoC) design, and in particular, to a method and apparatus for modeling a model necessary for the simulation which is performed prior to the design of a SoC.

2. Description of the Related Art

System-on-Chip (SoC) is composed of many elements such as processor, timer, interrupt controller, bus, memory, and embedded Software (eSW). The elements were realized in a single board just several years ago. At present, however, they can be fully realized in one circuit with the development of the semiconductor technology.

Today, for the system design necessary for SoC design, there is a need for an automatization tool required for the analyzing of the system architecture and verifying hardware and software.

In addition, as a degree of integration of chips has recently increased with the progress of the process technology, the design complexity of SoC also increases. The increase in the design complexity of the SoC technology increasingly needs a decrease in the time to market (TTM) and an increase in the design quality. To meet these needs, several methods for a variety of SoC modeling have been proposed, and a Transaction Level (TL) model method is the typical SoC modeling method. The TL model is a method for abstracting a Register Transfer Level (RTL) model in various levels to increase the design productivity and increase the simulation speed.

The use of the TL model, as it increases the simulation speed, enables even the architecture exploration and/or the performance estimation, contributing to an increase in the design quality.

The TL model-based design method is classified into a top-down approach method and a bottom-up approach method.

FIG. 1 illustrates top-down approach and bottom-up approach methods used for designing the general SoC system.

A top-down approach 100 is an approach method for designing a TL model 104 in a higher level and then refining it for realization. This can be usefully used for developing a new block. A bottom-up approach 102 is an approach method for modeling an existing RTL model 106 with a higher-level language to make the TL model 104. This is useful for higher-level simulation performed in the situation where the RTL model block has already been developed. Transaction Level Modeling (TLM) is a high-level modeling scheme that separately manages the realization of the functional unit or communication mechanism, and the inter-module communication. The TLM and the RTL model need a transactor to communicate with each other. The transactor serves to convert transaction into an RTL signal, or otherwise convert an expression level into transaction.

No matter whether the SoC designer uses the top-down approach 100 or the bottom-up approach 102 when performing modeling, the equivalence between the results of the TL model 104 and RTL model 106 should be guaranteed in order to trust the results on the TL model simulation.

Generally, during SoC design, the TL model can be consistent in operation with the RTL model according to the purpose of the modeling, but cannot be fully consistent with the RTL model in the cycle-by-cycle operation. In addition, the TL model, when it is used for software development, is occasionally modeled only as a partial function of the RTL model. Therefore, it is hard to use the formal equivalence check that performs mathematical modeling on the actual operation of the model rather than the simulation and determines if the mathematical model is equivalent. In this case, therefore, the equivalence between the results of the TL model and the RTL model is checked by the method of determining if there are equivalent outputs for the applied inputs, using the simulation method shown in FIG. 2.

FIG. 2 illustrates a process of performing modeling using a simulation method during the general SoC design.

A test vector 200 means an input necessary for verifying a SoC simulation modeling method, and is input to a TL model simulator 202 and a first transactor (Transactor #1) 206. The first transactor 206 outputs the input test vector to an RTL model simulator 204. Because the first transactor 206 needs more detailed information than the input test vector 200 to perform the lower-level RTL model, the first transactor 206 serves to add supplemental information thereto and output it to the RTL model simulator 204.

As described above, the TL model simulator 202, as it is a higher-level model, is faster than the RTL model. Therefore, the TL model simulator 202 directly receives the test vector 200 without any transactor, and then outputs the TL model simulation result thereon to a second transactor (Transactor #2) 208. In this case, because the output of the TL model simulator 202 is a higher-level output, the second transactor 208 generates, as a lower-level output, the higher-level simulation result received to maintain the equivalent level to that of the output of the RTL model simulator 204 that outputs the lower-level output.

A comparison unit (or comparator) 210 determines whether the output of the equivalent-level RTL model simulator 204 is equivalent to the simulation result of the second transactor 208, and if they are equivalent to each other, the comparator 210 can perceive that the modeling for successful simulation has been performed.

However, if the simulation method of FIG. 2 is used to perform modeling method verification for the SoC design, an unsuspected corner case may occur. To prevent the corner case, there is a need for a large number of test vectors such as the constrained random test vector, which is a tool for randomly automatically generating the test vector. After simulating the large number of test vectors, it is almost impossible for the human being to compare the results one by one with the naked eye. Therefore, there is a need for an automatization tool. However, even the use of the recently commercialized automatization tool can hardly automate the verification because of the characteristic that the RTL model simulator 204 and the TL model simulator 202 are not fully consistent with each other in terms of the cycle-by-cycle operation.

FIG. 3 is a timing diagram illustrating outputs given when the equivalent test vector 200 is input to the TL model simulator 202 and the RTL model simulator 204.

The desired result to be obtained through the general SoC design simulation results of FIG. 2 and FIG. 3 is to verify SoC design simulation by determining if the two simulators read the equivalent data from the equivalent addresses of the memory even though the equivalent test vector is input to the TL model simulator 202 and the RTL model simulator 204.

Generally, if an Advanced High-performance Bus (AHB) bus protocol is analyzed, the simulation result of the RTL model and the simulation result of the TL model are consistent with each other in operation.

Shown in FIG. 3 is the result obtained by simulating an operation in which the RTL model simulator 204 and the TL model simulator 202 read data from the memory for SoC realization.

In FIG. 3, the shown signals are signals used in the AHB, and HADDR, HTRANS, HRDATA and HREADY are result values of the TL/RTL model simulators; their definitions are given below.

HADDR: address of the memory
HTRANS: control signal indicating validity of HADDR
HRDATA: data that the TL/RTL model simulators have actually read from the memory
HREADY: control signal indicating whether the data actually read from the memory is valid. For example, HREADY='1' for Valid, and HREADY='0' for Invalid.

A clock (CLK) 300 is input to the TL/RTL model simulators along with the test vector.

It can be noted in FIG. 3 that two exemplary model simulators of the TL model simulator 202 and the RTL model simulator 204 both read data D0, D1, D2, D3 and D4 from memory addresses A2, A3, A4, A8 and AC.

FIG. 4 illustrates a process of comparing HADDR, HTRANS, HRDATA, and HREADY signals every cycle to verify the general SoC model simulation results. That is, the process shown in FIG. 4 reads signals from waveforms every cycle and compares the signal values.

In step 400, the RTL model simulator 204 and the TL model simulator 202 read in step 400 the HADDR, HTRANS, HRDATA and HREADY signals in FIG. 3 from the waveforms of the input signals every cycle. If the next cycle has started in step 402, the comparator 210 compares values of the signals read by the RTL model simulator 204 and the TL model simulator 202 in step 404.

However, even though the comparator 210 simply compares the equivalent signals in every cycle as described above to check the consistency between the signals read by the RTL model simulator 204 and the TL model simulator 202 in the general method, the results of the two simulations may not be equivalent to each other every time. For example, it can be seen that even as to HADDR of FIG. 3, at a clock cycle C1, HADDR of the RTL model simulator 204 is A0, but HADDR of the TL model simulator 202 is 9C.

Aside from the foregoing method of comparing the result of the RTL model simulator 204 with the result of the TL model simulator 202 every cycle, there is a method of comparing only the sequences as shown in FIG. 5.

FIG. 5 illustrates a method for comparing sequences to verify the general SoC model simulation result. In the sequence comparison process, the RTL model simulator 204 and the TL model simulator 202 read signals from waveforms in step 500, and push the signal values into their First Input First Output (FIFO) registers in step 504 every time the signal values of the waveforms change in step 502. In step 506, the comparator 210 reads the signal values pushed into the FIFO registers, and compare the read signal values, thereby comparing the sequences.

However, the sequence comparison method shown in FIG. 5 is also not accurate. It can be appreciated from the timing diagram of FIG. 3 that a sequence of HADDR among the output signal values of the RTL model simulator 204 includes 9C, A0, A2, A3, A4, A8, AC and B0, and a sequence of HADDR among the output signal values of the TL model simulator 202 includes 9C, A2, A3, A4, A8, AC and B0. That is, because the sequence of the output signal HADDR of the RTL model simulator 204 is different from the sequence of the output signal HADDR of the TL model simulator 202, even though the modeling results are actually consistent with each other, there is no currently available method capable of perceiving this fact.

SUMMARY OF THE INVENTION

An aspect of the present invention is to address at least the above-mentioned problems and/or disadvantages and to provide at least the advantages described below. Accordingly, an aspect of the present invention is to provide an apparatus and method for verifying modeling of a SoC design simulator.

Another aspect of the present invention is to provide an apparatus and method for comparing modeling result values of a SoC design simulator.

Another aspect of the present invention is to provide an apparatus and method for verifying equivalence between the existing RTL model and the TL model designed when the systems integrated when designing the TL model have different abstraction levels in a multi-processor system in SoC design.

Another aspect of the present invention is to provide an apparatus and method for verifying equivalence between a TL model and an RTL model based on a protocol when designing the TL model having various abstraction levels in an integrated system in SoC design.

Another aspect of the present invention is to provide an apparatus and method for verifying cycle accuracy for a TL model and an RTL model separately for each sub-system based on a protocol when designing the TL model having various abstraction levels in an integrated system in SoC design.

Another aspect of the present invention is to provide an apparatus and method for verifying data inconsistency between a TL model and an RTL model separately for each sub-system based on a protocol when designing the TL model having various abstraction levels in an integrated system in SoC design.

Another aspect of the present invention is to provide an apparatus and method for verifying simulation results of a TL model separately for each sub-system when multiple sub-systems are realized in SoC design.

Another aspect of the present invention is to provide an apparatus and method for verifying an RTL model and a TL model when multiple sub-systems each having multiple masters access a shared or non-shared model in SoC design.

Another aspect of the present invention is to provide an apparatus and method for verifying a TL model having various abstraction levels when modeling multiple masters each having various abstraction levels and an integrated system including a bus necessary when the multiple masters intend to access a slave, in SoC design.

According to one aspect of the present invention, there is provided a method for performing verification on a Transaction Level (TL) model having at least two abstraction levels in simulation modeling for design of a System-on-Chip (SoC). The TL model verification method includes acquiring, from a Register Transfer Level (RTL) waveform indicating a simulation result on an RTL model, first request information of at least two sub-systems modeled as the RTL model during the SoC design, and first response information output from slave models that have received the first request information; acquiring, from a TL waveform indicating a simulation result on the TL model, second request information of at least two sub-systems modeled as the TL model, and second response information output from slave models that have received the second request information; dividing the first and second request information and the first and second response information separately for each of the sub-systems, using bus mastering information related to a right to access the slave model over a bus by the sub-systems, acquired from the TL waveform and the RTL waveform; comparing the divided first and second request information with each other and comparing the divided first and second response information separately for the sub-systems of the RTL model and the sub-systems of the TL model; and verifying a modeling result on the TL model depending on the comparison results.

According to one aspect of the present invention, there is provided an apparatus for performing verification on a Transaction Level (TL) model having at least two abstraction levels in simulation modeling for design of a System-on-Chip (SoC). The TL model verification apparatus includes a Register Transfer Level (RTL) waveform reader for reading an RTL waveform indicating a simulation result on an RTL model, and outputting first request information of at least two sub-systems modeled as the RTL model during SoC design, and first response information output from slave models that have received the first request information; a TL waveform reader for reading and outputting, from a TL waveform indicating a simulation result on the TL model, second request information of at least two sub-systems modeled as the TL model, and second response information output from slave models that have received second request information; a sub-system divider for dividing the first and second request information and the first and second response information output from the RTL waveform reader and the TL waveform reader separately for each of the sub-system, using bus mastering information related to a right to access the slave model over a bus by the sub-systems; and an equivalence and data inconsistency comparator for comparing the divided first and second request information and the divided first and second response information separately for each of the sub-systems, and comparing the divided first and second request information with each other separately for sub-systems of the RTL model and sub-system of the TL model, and comparing the divided first and second response information with each other separately for the sub-systems of the RTL model and the sub-system of the TL model, thereby verifying a modeling result on the TL model.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

An embodiment of the present invention provides a technology in which a comparison unit for comparing output signal values of an RTL model simulator and a TL model simulator compares the results of the RTL model simulator and the TL model simulator taking into account an interface protocol used for accessing a memory, making it possible to determine whether the results of the RTL model simulator and the TL model simulator are equivalent to each other even though the RTL model simulator and the TL model simulator are not fully consistent with each other in cycle-by-cycle operation. In addition, the present invention provides a method for calculating a quantity of the cycle difference between the signals output by the two models when the RTL model simulator and the TL model simulator are equal in operation but different in cycle.

Figure 1:
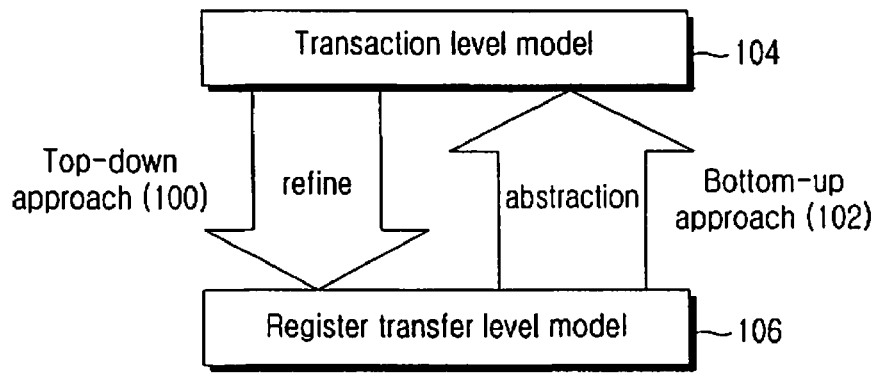
FIG. 1 illustrates top-down approach and bottom-up approach methods used for designing the general SoC system.
Figure 2:
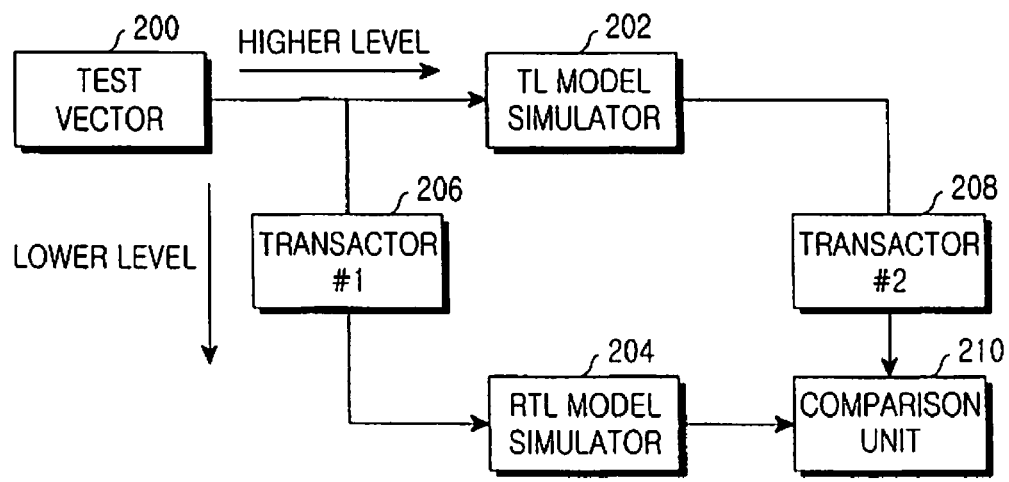
FIG. 2 illustrates a process of performing modeling using a simulation method during the general SoC design.
Figure 3:
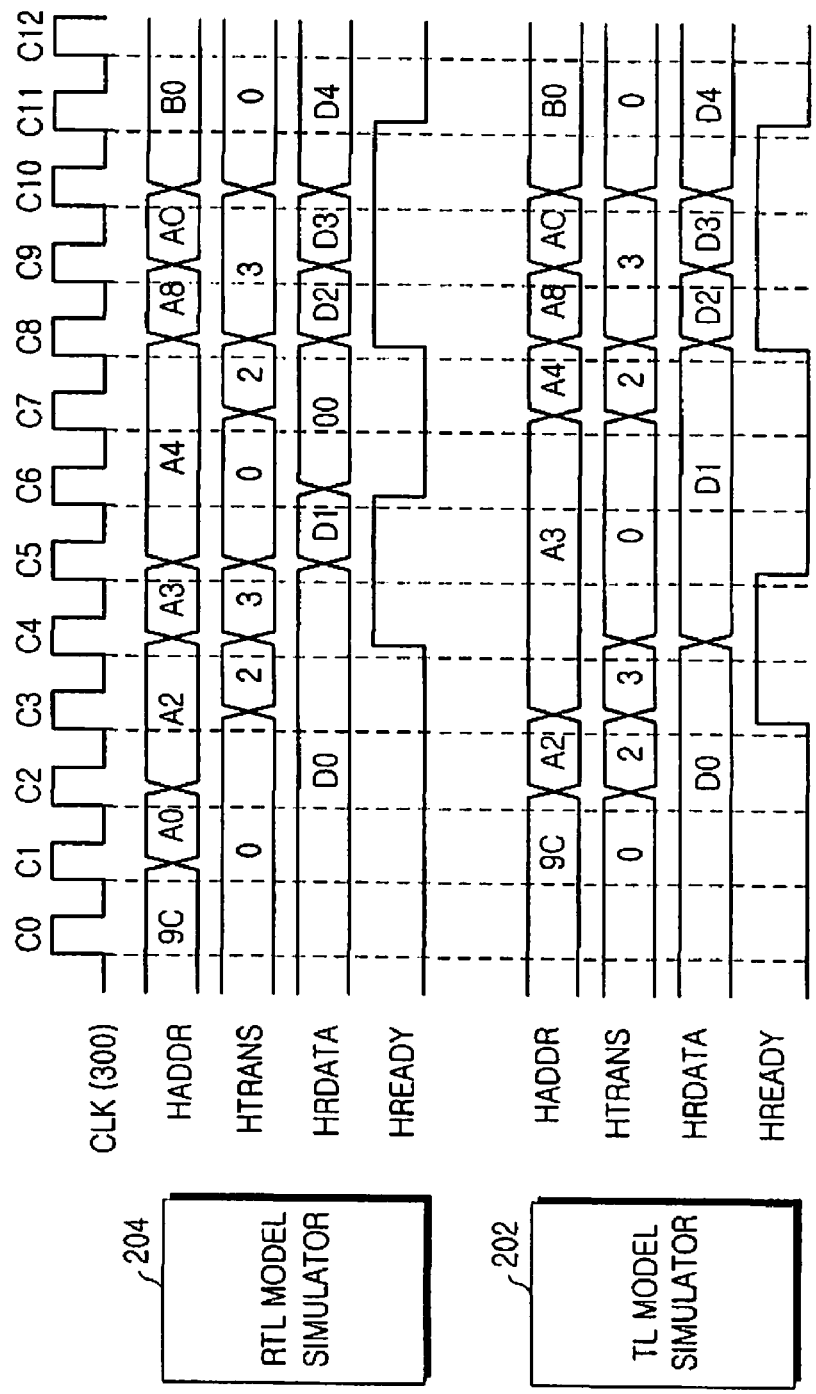
FIG. 3 illustrates simulation results on an operation in which a TL model simulator and an RTL model simulator read data from a memory for SoC realization.
Figure 4:
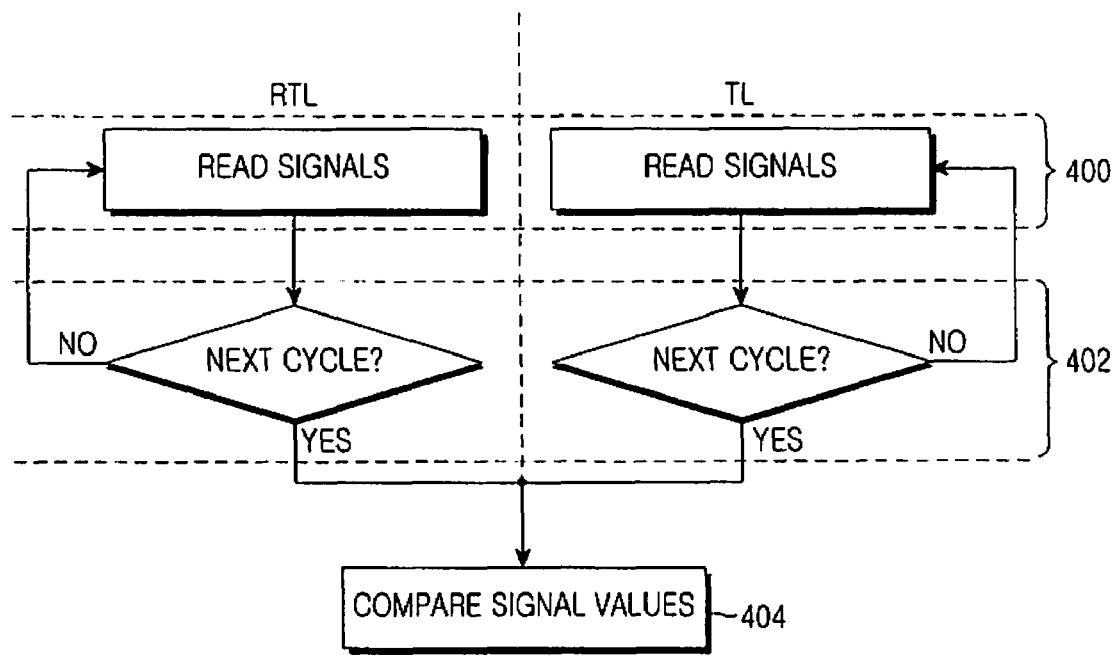
FIG. 4 illustrates a process of comparing signals every cycle to verify the general SoC model simulation results.
Figure 5:
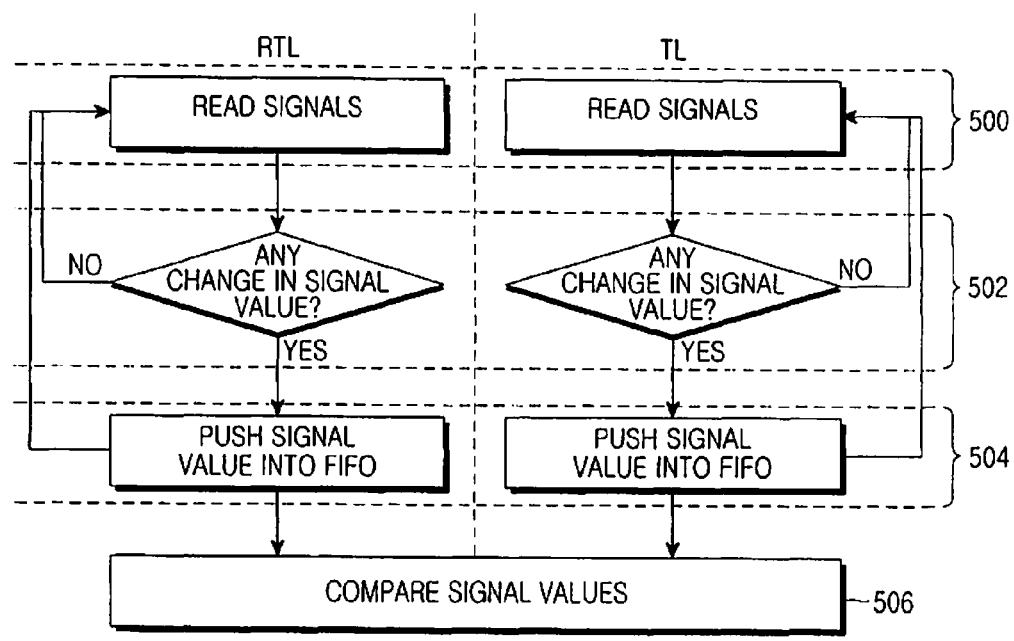
FIG. 5 illustrates a method for comparing sequences to verify the general SoC model simulation result.
Figure 6:
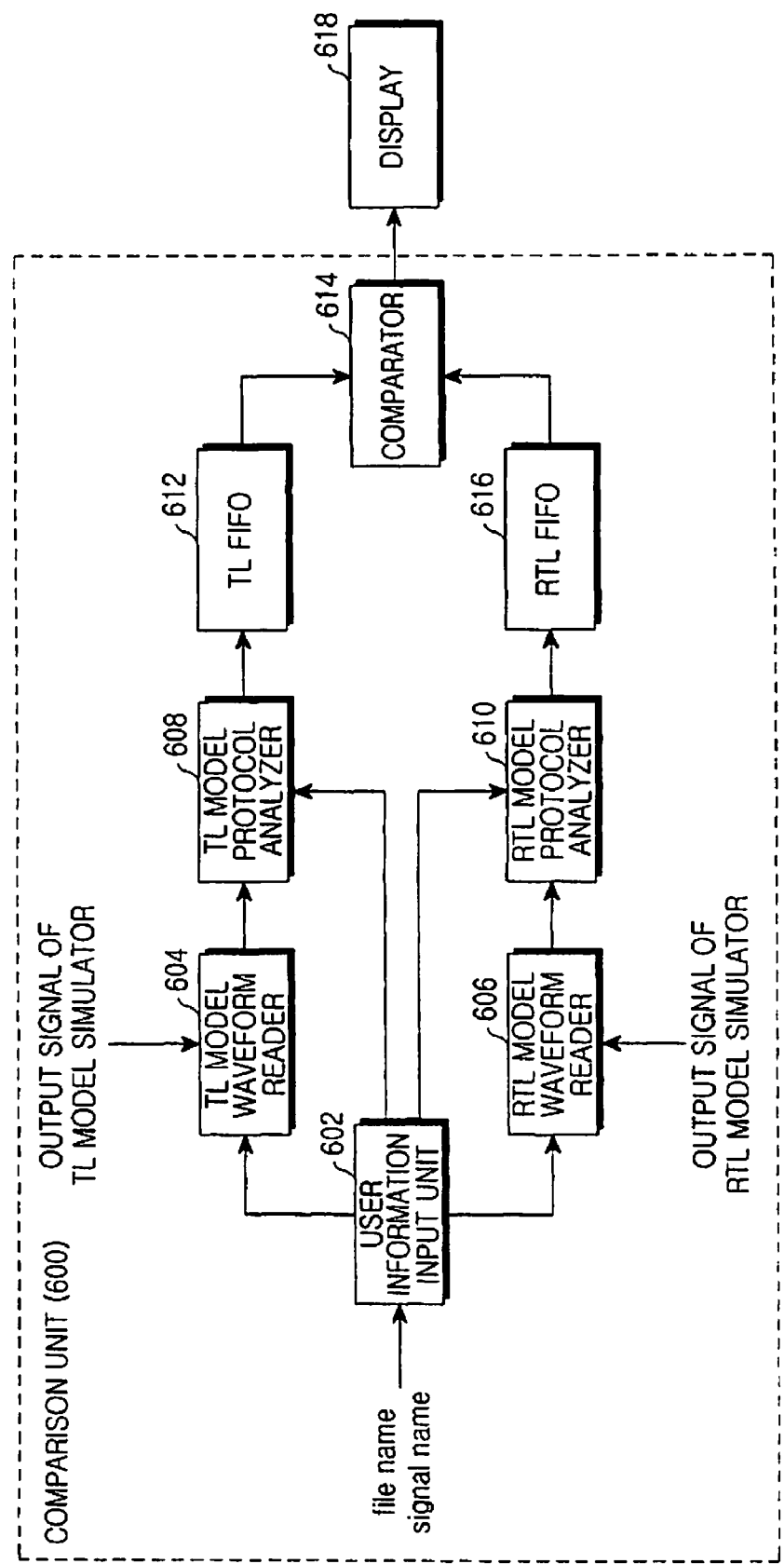
FIG. 6 illustrates a detailed structure of a comparison unit for comparing signal output values of an RTL model simulator and a TL model simulator according to a first embodiment of the present invention.

FIG. 6 illustrates a detailed structure of a comparison unit 600 for comparing signal output values of an RTL model simulator 204 and a TL model simulator 202 according to a first embodiment of the present invention.

The comparison unit 600 according to an embodiment of the present invention includes a user information input unit 602, a TL model waveform reader 604, an RTL model waveform reader 606, a TL model protocol analyzer 608, an RTL model protocol analyzer 610, a TL FIFO buffer 612, an RTL FIFO buffer 616, and a comparator 614.

It will be assumed herein that a handshaking protocol is modeled in the TL model simulator 202 and the RTL model simulator 204 as a protocol for accessing a memory. Therefore, the TL model and the RTL model each model a master and a slave, and store the modeling results. A description thereof will be given below with reference to the accompanying drawings.

The user information input unit 602 receives, from a user, a file name, a signal name, and valid information indicating which signal is valid, and sends, to the TL model waveform reader 604, user information for indicating which signal value the TL model waveform reader 604 should read from an output signal of the TL model simulator 202. The user information (or user configuration) includes file name and signal name information. For example, if there is an HTRANS signal of Advanced Micro-controller Bus Architecture (AMBA) AHB, the user information input unit 602 provides each of the TL model waveform reader 604 and the RTL model waveform reader 606 with the information indicating which signal corresponds to an HTRANS signal in the output signal of the TL model simulator 202, and which signal corresponds to an HTRANS signal in the output signal of the RTL model simulator 204.

The TL model waveform reader 604 reads, from the TL model simulator 202, the signal corresponding to the file name and the signal name received from the user information input unit 602, and outputs the read signal to the TL model protocol analyzer 608.

The signal that the TL model waveform reader 604 actually reads is a lower-level signal value output from the second transactor 208. Similarly, the user information input unit 602 sends, to the RTL model waveform reader 606, the file name, the signal name, and the valid information indicating which signal is valid.

The RTL model waveform reader 606 reads, from the output signal of the RTL model simulator 204, the signal corresponding to the file name and the signal name received from the user information input unit 602, and outputs the read signal to the RTL model protocol analyzer 610.

The TL model protocol analyzer 608 extracts only the valid information among the signals received from the TL model waveform reader 604 taking into account the bus protocol for accessing the memory. Though the valid information and the method for extracting the valid information are different according to the protocol, the handshaking protocol is generally used. In this case, the TL model protocol analyzer 608 receives, from the user information input unit 602, the valid information indicating which signal among the signals received from the TL model waveform reader 604 is a valid signal. A description of the handshaking protocol will be given below with reference to FIG. 7.

The TL model protocol analyzer 608 stores, in the TL FIFO buffer 612, the valid signal values among the signals output from the TL model waveform reader 604 based on the file name, signal name and valid information received from the user information input unit 602. In the embodiment of the present invention, because the protocol is assumed as a handshaking protocol, the valid signal values include a request signal, a request information signal, a response signal, and a response information signal.

The RTL model protocol analyzer 610 extracts only the valid information among the signals received from the RTL model waveform reader 606 taking into account the bus protocol for accessing the memory. Though the valid information and the method for extracting the valid information are different according to the protocol, the handshaking protocol is generally used. Although the TL model protocol analyzer 608 and the RTL model protocol analyzer 610 are shown as separate blocks in FIG. 6, they can be realized in one block.

The TL FIFO buffer 612 stores the signal values output from the TL model protocol analyzer 608 according to the indexes on a FIFO basis. The signal values stored in the TL FIFO buffer 612 are called 'elements', and a request signal, a request information signal, a response signal and a response information signal, which are the signal values determined as valid information by the TL model protocol analyzer 608, are stored in the TL FIFO buffer 612. A bundle of the request signal, the request information signal, the response signal and the response information signal can also be referred to as the 'transaction'.

The RTL FIFO buffer 616 stores the signal values output from the RTL model protocol analyzer 610 according to the indexes on a FIFO basis. Similarly, the request signal, the request information signal, the response signal and the response information signal (i.e. the transaction), which are the signal values determined as valid information by the RTL model protocol analyzer 610, are stored in the RTL FIFO buffer 616, and such signal values are referred to as 'elements'.

The comparator 614 compares functions of the elements stored in the TL FIFO buffer 612 and the RTL FIFO buffer 616. The phrase "comparing functions of the elements" implies an operation of determining whether the request signal, request information signal, response information signal and response signal stored in the TL FIFO buffer 612 are consistent with the request signal, request information signal, response information signal and response signal stored in the RTL FIFO buffer 616. A description of the request signal, request information signal, response information signal and response signal will be given below with reference to FIG. 7. If the functions of the elements are equivalent, the comparator 614 compares cycle accuracies of the TL model simulator 202 and the RTL model simulator 204. The comparator 614 outputs the comparison results on the element functions and the cycle accuracies of the two FIFO buffers 612 and 616 to the user by means of a display 618. Other output means are contemplated.

Assuming that the TL FIFO buffer 612 and the RTL FIFO buffer 616 each have N sizes (with index 0~index N−1), the comparator 614 first compares an element function with index 0 of the RTL FIFO buffer 616 with element functions with indexes 0 to N−1 of the TL FIFO buffer 612. The term 'size of the TL FIFO buffer 612 and the RTL FIFO buffer 616' as used herein refers to the number of transactions stored in the TL FIFO buffer 612 and the RTL FIFO buffer 616. Next, the comparator 614 compares an element function with index 1 of the RTL FIFO buffer 616 with element functions with indexes 0 to N–1 of the TL FIFO buffer 612. In this manner, the comparator 614 compares the element values in the TL FIFO buffer 612, and outputs the results to the display 618.

Figure 7:
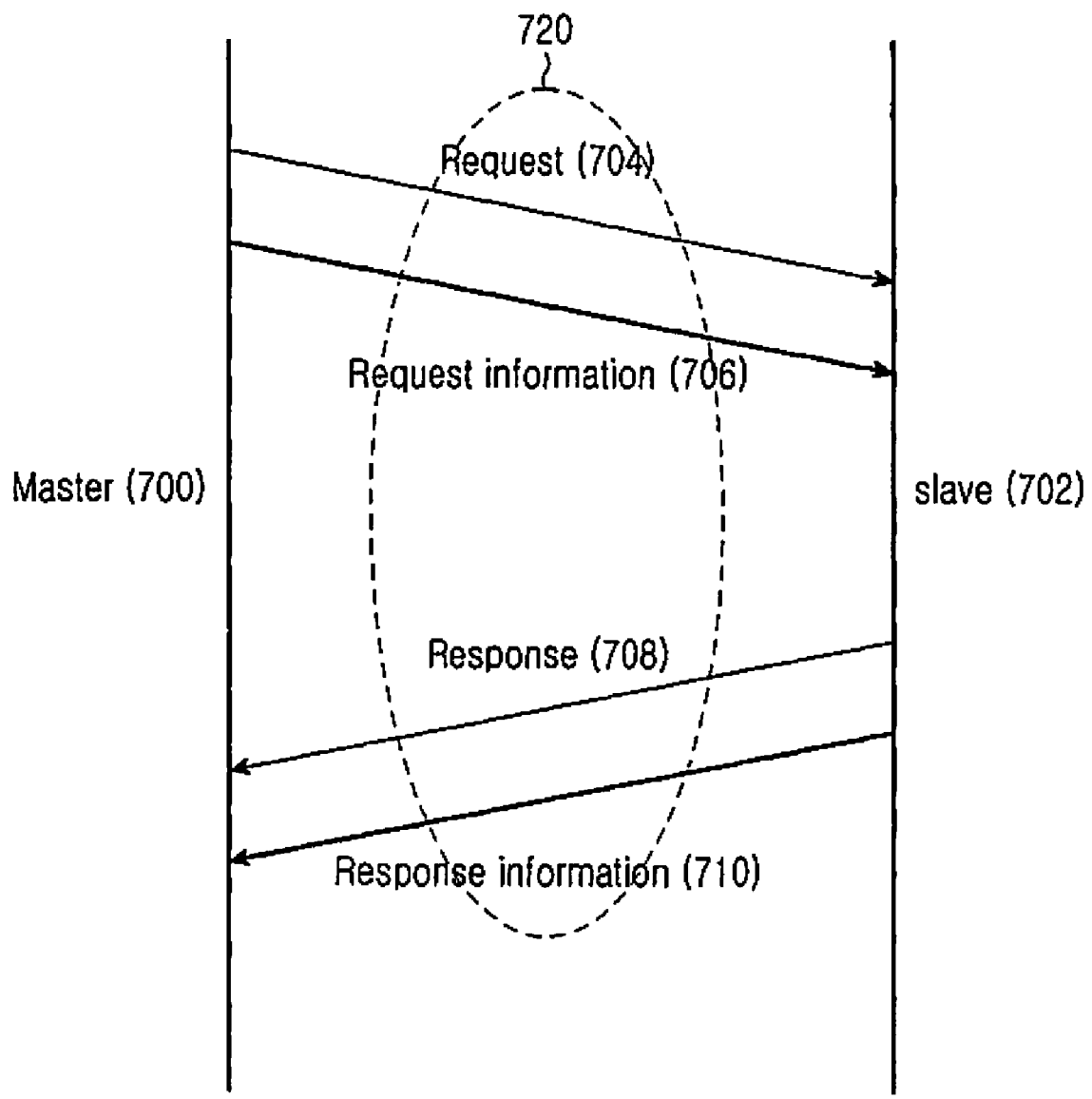
FIG. 7 illustrates a handshaking protocol by which a TL model protocol analyzer and an RTL model protocol analyzer extract valid information according to the first embodiment of the present invention.

FIG. 7 illustrates a handshaking protocol by which a TL model protocol analyzer 608 and an RTL model protocol analyzer 610 extract valid information according to the first embodiment of the present invention.

It is assumed herein that the handshaking protocol is modeled in the TL model simulator 202 and the RTL model simulator 204, as a protocol for accessing the memory. Therefore, the TL model and the RTL model each model a master and a slave, and store the modeling results.

Referring to FIGS. 6 and 7, the protocol analyzers 608 and 610 according to an embodiment of the present invention extract the request and response signals from the results obtained by modeling the master and the slave, and push them into the FIFO buffers 612 and 616, respectively.

In FIG. 7, one side that initiates the transfer during data exchange is defined as a master 700, and the other side that responds to the transfer incoming from the master 700 is defined as a slave 702. The term 'transfer' as used herein refers to a bundle of multiple request signals and their associated response signals, and is denoted by reference numeral 720 in FIG. 7.

To initiate the transfer to the slave 702, the master 700 should deliver information on the transfer to the slave 702. If the transfer is a data request transfer, the master 700 should provide the slave 702 with the information indicating the type of the necessary data and the type of the transfer. In FIG. 7, the information on the transfer is expressed as a request information signal. That is, the 'request information signal' is a bundle of the signals that the slave 702 needs to understand the request signal from the master 700.

The signal expressed as request 704 in FIG. 7 is a signal indicating when request information 706 is valid. When several slaves share request information signals, the request signal 704 is used even when the master 700 intends to send the request information signal only to a particular slave. Upon receipt of the request signal 704, the slave 702 analyzes the request information signal 706 and shows a corresponding response.

If the master 700 has requested data, the slave 702 sends the corresponding data to the master 700, and if an error has occurred, the slave 702 should inform the master 700 of the occurrence of an error. Such a response of the slave 702 is expressed as a signal of response information 710 in FIG. 7. In other words, the response information signal 710 is a bundle of the signals corresponding to the response that the slave 702 makes in response to the request signal 704 from the master 700.

Even as to the response information signal 710 transmitted from the slave 702 to the master 700, the slave 702 needs to inform the master 700 when the response information signal 710 is valid. The signal expressed as response 708 in FIG. 7 is a signal used for informing the master 700 when the response information signal 710 is valid.

In some cases, the request/response signals are implicit. Like in the case of memory access, if the master 700, after sending a request signal, waits for a predetermined access time even though there is no particular response signal from the slave 702, it is assumed that the access has been made successfully. In this case, because the request signal is activated for a predetermined access time and then inactivated after a lapse of the access time, the time at which the request signal is inactivated can be considered as the time at which the response information signal is valid.

The first embodiment of the present invention, rather than determining whether the master 700 and the slave 702 operate according to the protocol, determines whether the request information signal and response information signal being equivalent to the request information signal and response information signal exchanged between the master 700 and the slave 702 modeled in the RTL model simulator 204 are exchanged even between the master 700 and the slave 702 modeled in the TL model simulator 202.

That is, the first embodiment determines whether the master 700 and the slave 702 exchange the equivalent request information signal and the equivalent response information signal with each other, depending on the results of the RTL model simulator 204 and the TL model simulator 202.

Namely, when the equivalent request signal and request information signal are input to the TL model simulator 202 and the RTL model simulator 204, the present invention determines whether the equivalent response signal and response information signal are output from the two model simulators 202 and 204, taking into account the bus protocol for accessing the memory.

The phrase 'taking into account the bus protocol' as used herein refers to comparing only the response information signals of the RTL model simulator and the TL model simulator for the activated response signals, and disregarding the response information signals for the inactivated response signals, to thereby determine whether they are equivalent to each other. The embodiment, because it compares the response information signals on the basis of the response signals, has no problem in making the comparison even though the cycle changes. This is because if the protocol is taken into account, it is possible to determine when the data is valid even though the cycle changes.

In addition, the present invention calculates the cycle accuracy for verification of the cycle accuracies of the TL model simulator 202 and the RTL model simulator 204. The cycle accuracy calculated by the comparator 614 according to an embodiment of the present invention is composed of two types of information: latency accuracy and duration accuracy. A conceptual description thereof will be given below with reference to FIG. 8.

Figure 8:
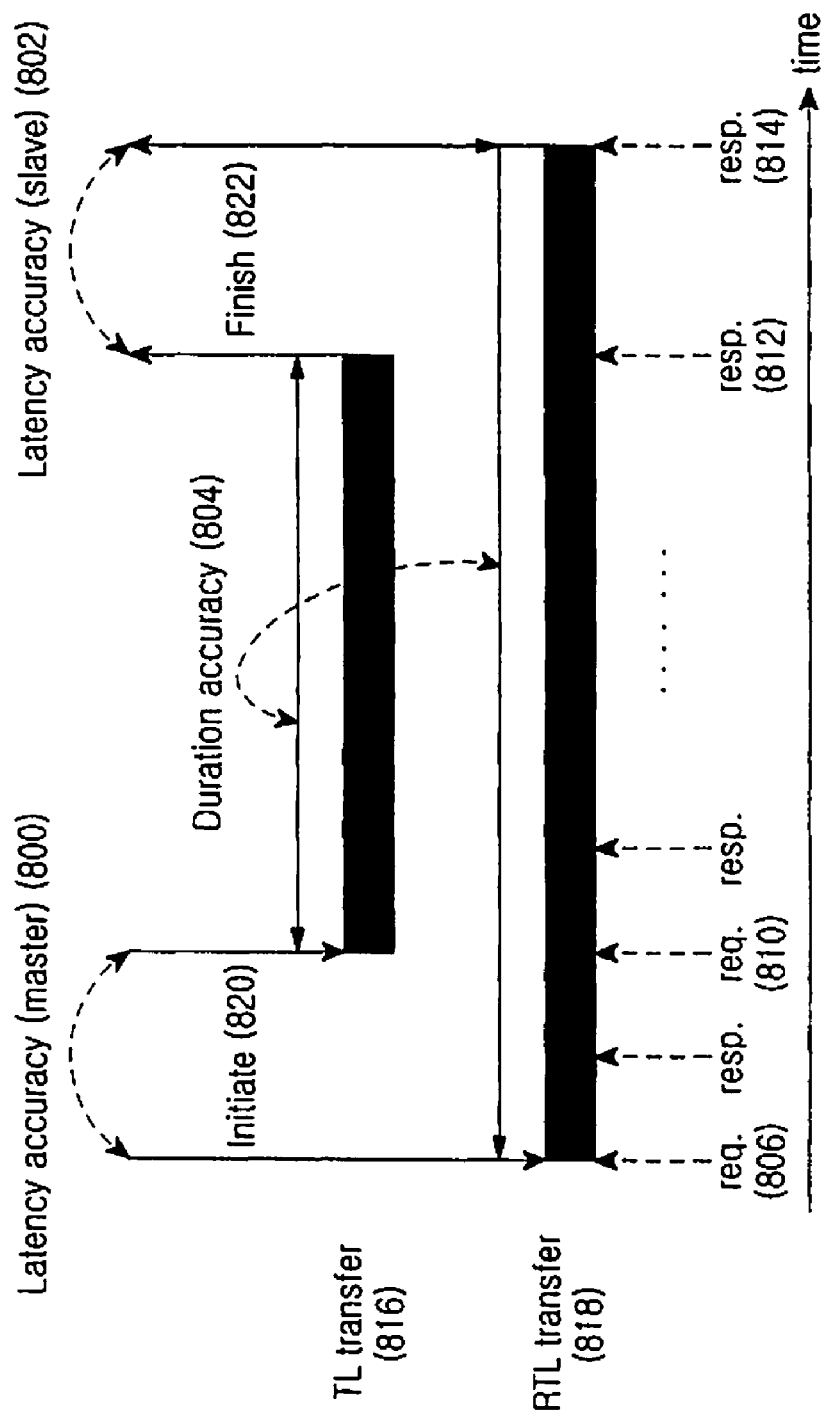
FIG. 8 illustrates a process in which a comparator calculates cycle accuracy according to the first embodiment of the present invention.

FIG. 8 illustrates a process in which a comparator 614 calculates cycle accuracy according to the first embodiment of the present invention.

Before a description of FIG. 8 is given, definitions of the terms used herein will be given below.

Transfer: bundle of multiple request signals and their associated response signals Initiate 820: the time at which a first (or initial) request signal in the transfer is generated.

Finish 822: the time at which a final (or last) response signal in the transfer is generated.

Latency Accuracy 800 and 802: the latency accuracy 800 for the master is the value obtained by measuring a degree of the cycle equivalence between the time at which the first request signal is generated in the RTL model simulator 204 and the time at which the first request signal is generated in the TL model simulator 202, and the latency accuracy 802 for the slave is the value obtained by measuring a degree of the cycle equivalence between the time at which the first response signal is generated in the RTL model simulator 204 and the time at which the first response signal is generated in the TL model simulator 202.

Duration Accuracy 804: the value obtained by measuring a degree of equivalence between the duration from the time at which the first request signal is generated in the RTL model simulator 204 until the time at which the final response signal is generated in the RTL model simulator 204, and the duration from the time at which the first request signal is generated in the TL model simulator 202 until the time at which the final response signal is generated in the TL model simulator 202. Herein, the period between the time at which the first request signal is generated and the time at which the final response signal is generated is referred to as the 'duration'.

From the standpoint of the bus, the time at which the bus starts to be occupied can be defined as an 'initiate time', and the time at which the bus is released can be defined as a 'finish time'.

The latency accuracies 800 and 802 indicate a degree of accuracy of the time at which the transfer is initiated in the TL model simulator 202 and the RTL model simulator 204, respectively. Reference numeral 806 indicates the time, or the initiate time, at which the first request signal 806 in an RTL transfer 818 is generated, and reference numeral 810 indicates the time, or the initiate time, at which the first request signal 810 in a TL transfer 816 is generated. Therefore, the comparator 614 compares the two time points as shown by reference numeral 820, thereby measuring the latency accuracy 800 at the master 700.

The RTL transfer 818 is a bundle of the request signals and response signals generated in the RTL model simulator 204, and the TL transfer 816 is a bundle of the request signals and response signals generated in the TL model simulator 202.

That is, in the process of measuring the latency accuracy 800 of the master 700, the comparator 614 according to an embodiment of the present invention compares the initiate time of the RTL transfer 818 with the initiate time of the TL transfer 816. To measure the latency accuracy 802 of the slave 702, the comparator 614 measures the finish period 822 between the finish time for the TL model simulator 202 and the finish time for the RTL model simulator 204. That is, the comparator 614 compares the finish time 812 at which the final response signal in the TL transfer 816 is generated, with the finish time 814 at which the final response signal in the RTL transfer 818 is generated.

The latency accuracy is an index that can be used for estimating the accuracy of the performance estimation results of the SoC system. The duration accuracy indicates a degree of accuracy of the duration from the time at which the transfer is initiated until the time at which the transfer is finished.

During master verification, the TL model simulator 202 and the RTL model simulator 204 receive the equivalent responses. The duration accuracy can be used for estimating the accuracy of the utilization of the interface, like the bus, shared by several masters and slaves.

Because the duration affects even the performance of the SoC system, the duration accuracy is also used for estimating the accuracy of the performance estimation results.

In order for the comparator 614 to calculate the cycle accuracy, the TL model protocol analyzer 608 and the RTL model protocol analyzer 610 should extract even the cycle information from the TL model waveform reader 604 and the RTL model waveform reader 606, respectively.

The cycle information, the information indicating orders of the initiate and finish cycles, may include the time (or transfer-initiated time) at which the transfer is initiated and the time (or transfer-finished time) at which the transfer is finished. Once the two points in time are known, the comparator 614 can calculate the latency accuracy and the duration accuracy.

The TL model protocol analyzer 608 and the RTL model protocol analyzer 610 deliver the response information to the comparator 614 along with the cycle information indicating the transfer-initiated time and the transfer-finished time.

The comparator 614, as described above, first determines whether the element functions of the two FIFO buffers 612 and 616 are equivalent. If the functions are not equivalent, the comparator 614 calculates the cycle accuracy using the cycle information. The comparator 614 uses Equation (1) and Equation (2) in calculating the cycle accuracy.

First, the comparator 614 calculates the latency accuracy using Equation (1).

$$LatencyAccuracy = 1 - \frac{\sum LatencyError}{TotalSimulationCycle_{RTL}} \quad (1)$$

where LatencyError=|InitiateCycle$_{TL}$−InitiateCycle$_{RTL}$| for the master, or LatencyError=|FinishCycle$_{TL}$−FinishCycle$_{RTL}$| for the slave The comparator 614 calculates the duration accuracy 804 using Equation (2).

$$DurationAccuracy = 1 - \frac{\sum DurationError}{TotalSimulationCycle_{RTL}} \quad (2)$$

where $$DurationError = \left| \begin{array}{c} (FinishCycle_{TL} - InitiateCycle_{TL}) \\ -(FinishCycle_{RTL} - InitiateCycle_{RTL}) \end{array} \right|.$$

In Equation (1) and Equation (2), InitiateCycle$_{TL}$ and InitiateCycle$_{RTL}$ denote initiate cycles of the transfers in the TL model simulator 202 and the RTL model simulator 204, respectively. Similarly, FinishCycle$_{TL}$ and FinishCycle$_{RTL}$ denote finish cycles of the transfers in the TL model simulator 202 and the RTL model simulator 204, respectively. The finish cycle is information indicating in which cycle the finish exists. The comparator 614 can calculate a latency error and a duration error using the initiate cycle and the finish cycle. In addition, the comparator 614 can calculate an error rate by accumulating all errors and dividing the accumulated error by the total simulation cycle, and can calculate the accuracy by subtracting the error rate from 1.

Further, TotalSimulationCycle$_{RTL}$ denotes the total cycle for which the RTL simulation is performed. Because the calculated accuracy indicates an accuracy based on the RTL model simulator 204, the comparator 614 calculates the accuracy on the basis of the simulation cycle of the RTL model simulator 204. The cycle accuracy is dependent on the input test vector, so it is preferable to calculate the cycle accuracy separately for each function desired to be tested.

Figure 9:
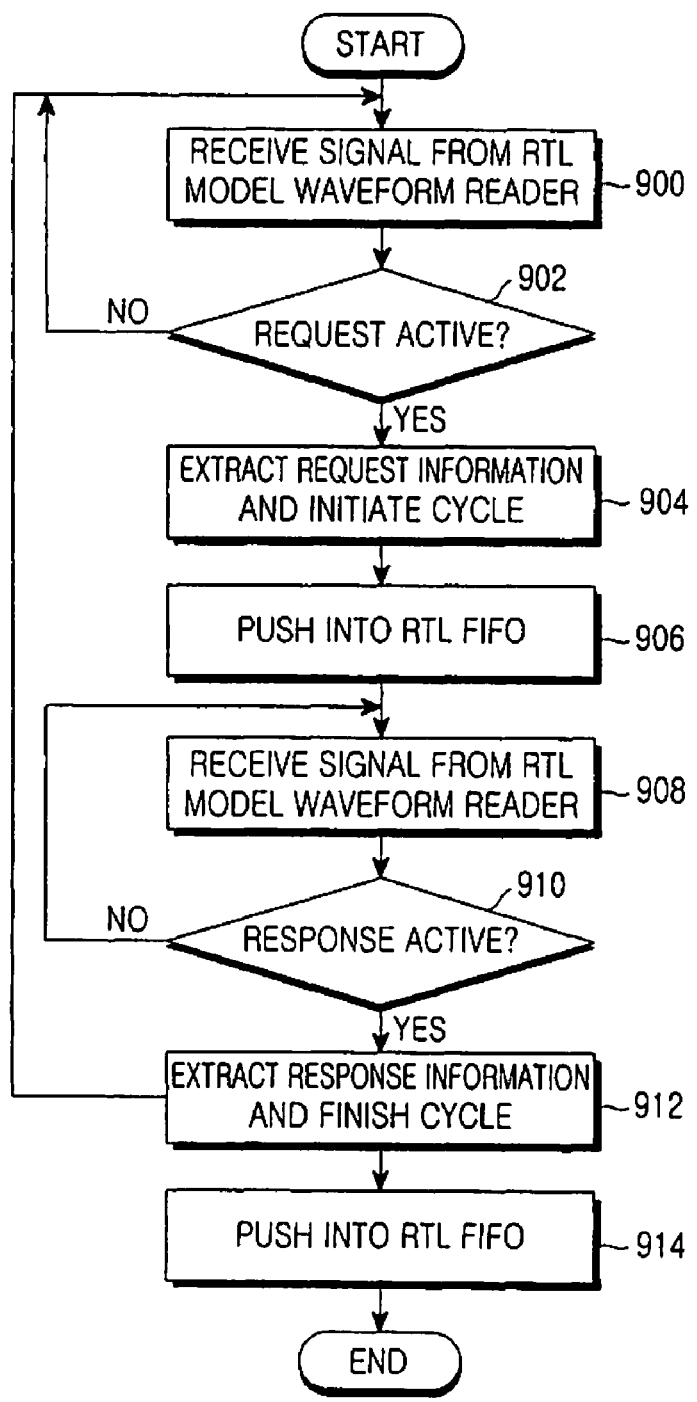
FIG. 9 illustrates an operation of an RTL model protocol analyzer according to the first embodiment of the present invention.

FIG. 9 illustrates an operation of an RTL model protocol analyzer 610 according to the first embodiment of the present invention.

In step 900, the RTL model protocol analyzer 610 receives a signal from an RTL model waveform reader 606. Further, to extract the request information signal, the response information signal and the cycle information, the RTL model protocol analyzer 610 receives a file name, a signal name and valid information from a user information input unit 602.

In step 902, the RTL model protocol analyzer 610 determines whether a request signal among the signal values received from a TL model waveform reader 604 is activated. The request signal can be mapped to one signal on a 1:1 basis, or can be a combination of several signals. If it is determined in step 902 that the request signal is activated, the RTL model protocol analyzer 610 extracts, in step 904, request information and cycle information (initiate cycle) from the signals received from an RTL model waveform reader 606, and pushes, in step 906, the extracted request information and initiate cycle into an RTL FIFO buffer 616. The information indicating which signal is the request information and indicating when is the initiate cycle, is received from the user information input unit 602.

In step 908, the RTL model protocol analyzer 610 again receives a signal from the RTL model waveform reader 606. Thereafter, the RTL model protocol analyzer 610 determines whether a response signal is activated, and extracts response information and finish cycle information. The RTL model protocol analyzer 610 determines in step 910 whether the response signal is activated. If it is determined in step 910 that the response signal is activated, the RTL model protocol analyzer 610 extracts response information signal and finish cycle in step 912. Similarly, the information indicating which signal is the response information signal and indicating when is a finish cycle, is also received from the user information input unit 602.

In step 914, the RTL model protocol analyzer 610 pushes the extracted response information and finish cycle into the RTL FIFO buffer 616.

Figure 10:
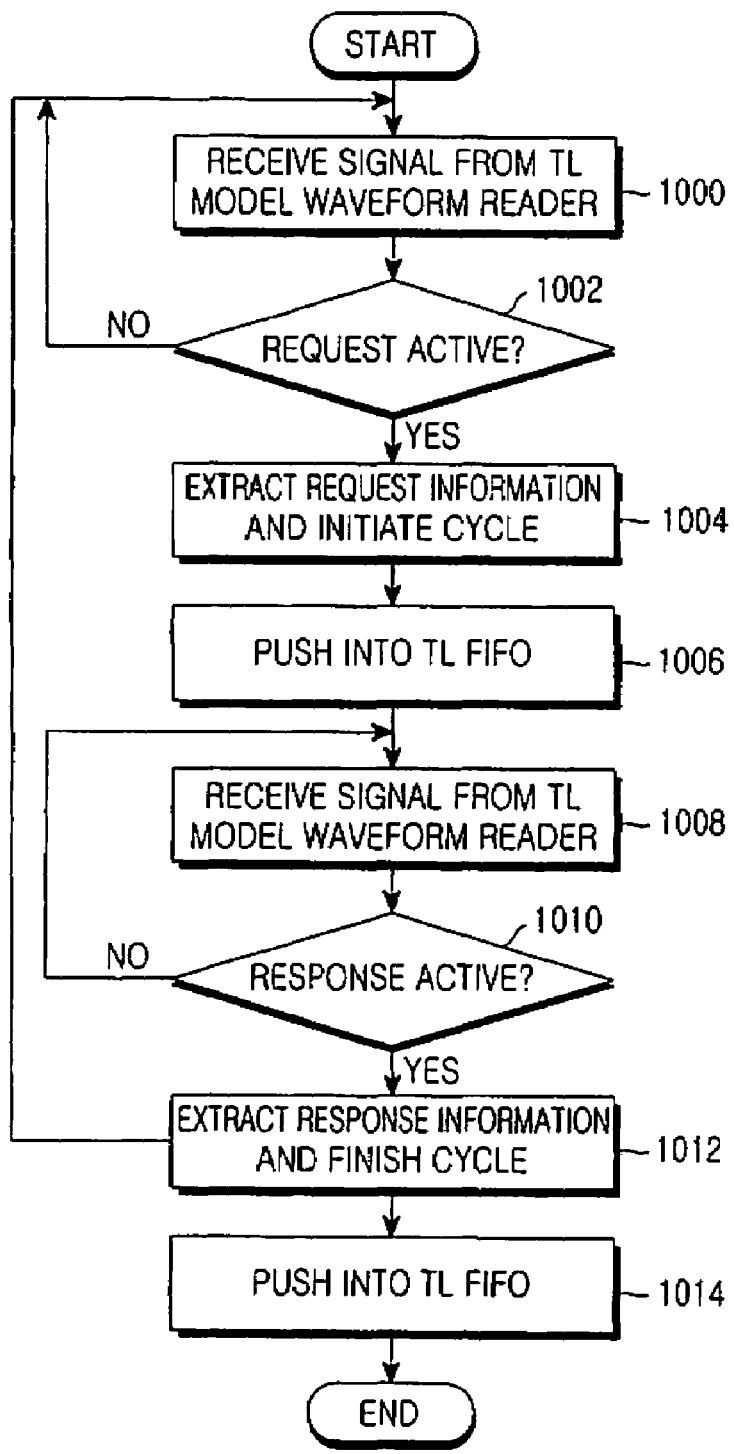
FIG. 10 illustrates an operation of a TL model protocol analyzer according to the first embodiment of the present invention.

FIG. 10 illustrates an operation of a TL model protocol analyzer 608 according to the first embodiment of the present invention.

In step 1000, the TL model protocol analyzer 608 receives a signal from a TL model waveform reader 604. Further, to extract the request information signal, the response information signal and the cycle information, the TL model protocol analyzer 608 receives a file name, a signal name and valid information from a user information input unit 602.

The TL model protocol analyzer 608 determines in step 1002 whether a request signal among the signal values received from the TL model waveform reader 604 is activated. The request signal can be mapped to one signal on a 1:1 basis, or can be a combination of several signals. If it is determined in step 1002 that the request signal is activated, the TL model protocol analyzer 608 extracts, in step 1004, request information and cycle information from the signals received from the TL model waveform reader 604, and pushes, in step 1006, the extracted request information and initiate cycle into a TL FIFO buffer 612. The information indicating which signal is the request information and indicating when is the initiate cycle, is received from the user information input unit 602.

In step 1008, the TL model protocol analyzer 608 again receives a signal from the TL model waveform reader 604. Thereafter, the TL model protocol analyzer 608 determines whether a response signal is activated, and extracts response information and finish cycle information. The TL model protocol analyzer 608 determines in step 1010 whether the response signal is activated. If it is determined in step 1010 that the response signal is activated, the TL model protocol analyzer 608 extracts response information signal and finish cycle in step 1012. Similarly, the information indicating which signal is the response information signal and indicating when is a finish cycle, is also received from the user information input unit 602.

In step 1014, the TL model protocol analyzer 608 pushes the extracted response information and finish cycle into the TL FIFO buffer 612.

Although the protocol analyzers 608 and 610 are separately realized herein for the TL model and the RTL model for convenience, they can be actually realized with one protocol analyzer.

Describing again the operations of the protocol analyzers 608 and 610, which are at the core of the present invention described with reference to FIGS. 9 and 10, the protocol analyzers 608 and 610 read waveforms from the TL model waveform reader 604 and the RTL model waveform reader 606, respectively, extract necessary information therefrom, and push them into the FIFO buffers 612 and 616. The protocol analyzers 608 and 610 receive the necessary signal values from the TL model waveform reader 604 and the RTL model waveform reader 606, respectively, extract the request information, the response information and the cycle information, and receive the necessary environment information (or configuration) from the user information input unit 602. The protocol analyzers 608 and 610 read signals from the TL model waveform reader 604 and the RTL model waveform reader 606, and determine whether a request signal is activated. The request signal can be mapped to one signal on a 1:1 basis, or can be a combination of several signals.

The protocol analyzers 608 and 610 receive, from the user information input unit 602, the information indicating which signal corresponds to the request signal and indicating in which combination the corresponding signals make the request signals. If the request signal is activated, the protocol analyzers 608 and 610 extract the then-request information and initiate cycle, and push them into the FIFO buffers 612 and 616. Further, the protocol analyzers 608 and 610 receive, from the user information input unit 602, even the information indicating which signal is the request information and indicating when is the initiate cycle. If the response signal is activated, the protocol analyzers 608 and 610 push the response information and the finish cycle into the FIFO buffers 612 and 616. Like in the case of the request, the protocol analyzers 608 and 610 receive the necessary information from the TL model waveform reader 604, the RTL model waveform reader 606, and the user information input unit 602.

Figure 11A:
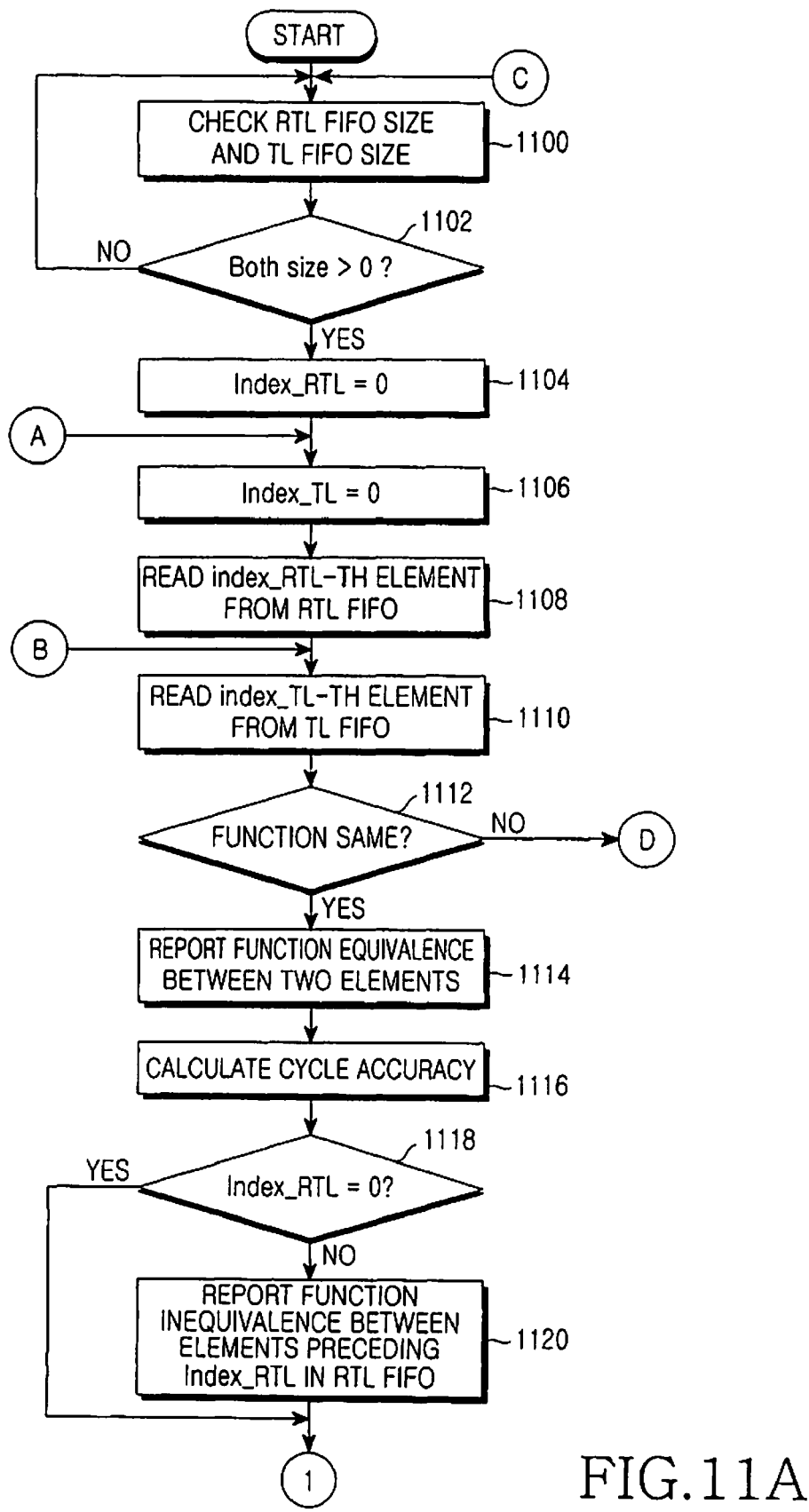
FIGS. 11A and 11B illustrate an operation of a comparator for comparing a TL model simulation result with an RTL model simulation result based on the information extracted by a TL model protocol analyzer and an RTL model protocol analyzer according to the first embodiment of the present invention.
Figure 11B:
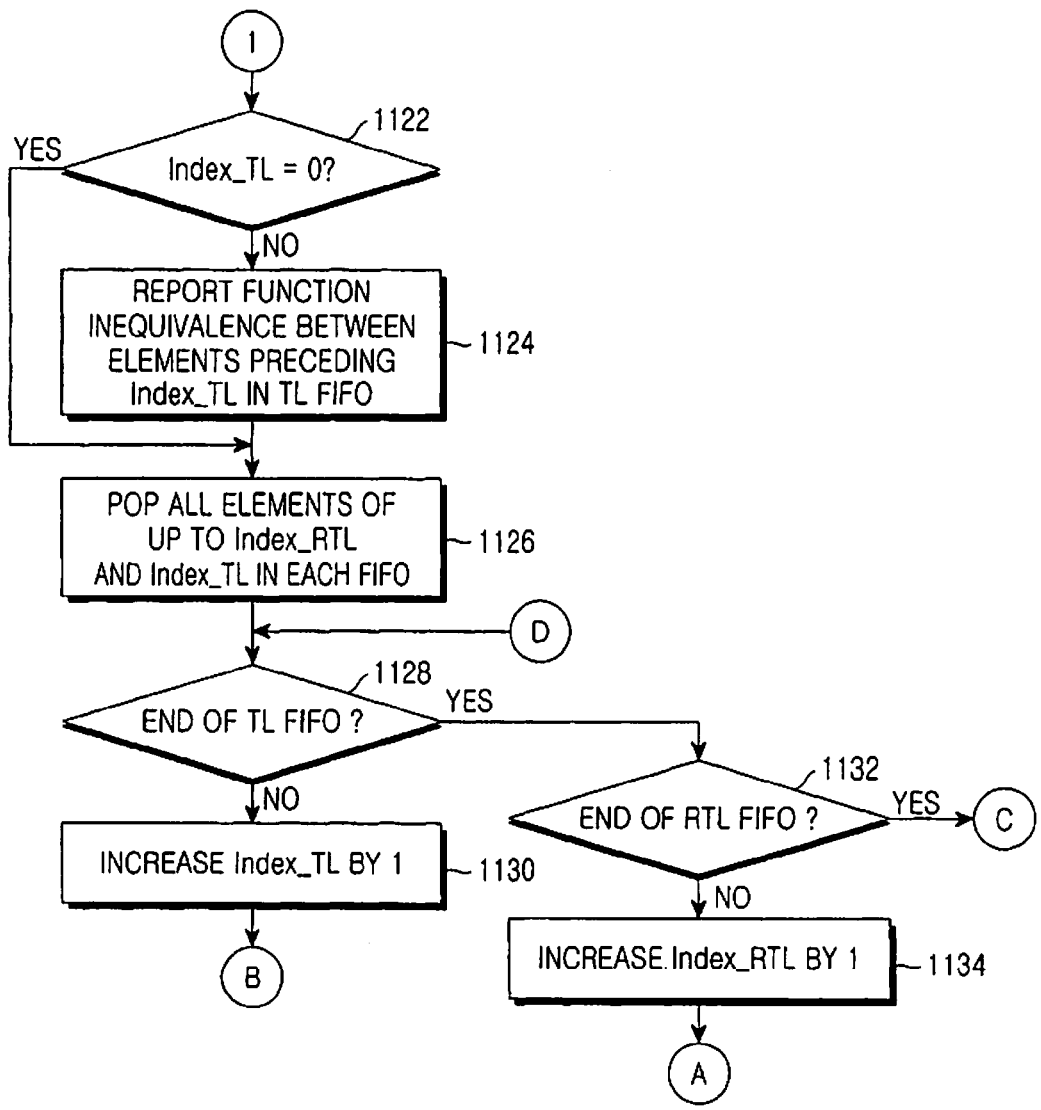

FIGS. 11A and 11B illustrate an operation of a comparator 614 for comparing a TL model simulation result with an RTL model simulation result based on the information extracted by a TL model protocol analyzer 608 and an RTL model protocol analyzer 610 according to the first embodiment of the present invention.

The comparator 614 according to the first embodiment of the present invention initiates its operation when the number of information pushed into both of the two FIFO buffers 612 and 616 is greater than or equal to 1. The comparator 614 compares the information-pushed elements in the both FIFO buffers 612 and 616 one by one, to determine whether there is any equivalent element. If it is determined that there is an equivalent element(s), the comparator 614 calculates cycle accuracy using Equation (1) and Equation (2), and deletes the determined elements from the FIFO buffers 612 and 616.

With reference to FIGS. 11A and 11B, a detailed description will now be made of an operation of the comparator 614.

In step 1100, the comparator 614 checks sizes of a TL FIFO buffer 612 and an RTL FIFO buffer 616. That is, the comparator 614 determines how much data actually exists in the TL FIFO buffer 612 and the RTL FIFO buffer 616. The comparator 614 determines in step 1102 whether both sizes of the TL FIFO buffer 612 and the RTL FIFO buffer 616 are greater than '0', and if it is determined that both sizes of the TL FIFO buffer 612 and the RTL FIFO buffer 616 are greater than '0', the comparator 614 proceeds to step 1104.

In steps 1104 and 1106, the comparator 614 initializes the parameters for storing indexes of the TL FIFO buffer 612 and the RTL FIFO buffer 616. In FIGS. 11A and 11B, 'Index_RTL' is a parameter for storing the information indicating which data in the RTL FIFO buffer 616 the comparator 614 has been compared, and 'Index_TL' is a parameter for storing the information indicating which data in the TL FIFO buffer 612 the comparator 614 has been compared. In each of the parameters, an index of the corresponding FIFO buffer is stored.

After initializing an index of the RTL FIFO buffer 616 to '0' in step 1104 and initializing an index of the TL FIFO buffer 612 to '0' in step 1106, the comparator 614 reads an 'Index_RTL'-th element from the RTL FIFO buffer 616 in step 1108. Further, the comparator 614 reads an 'Index_TL'-th element from the TL FIFO buffer 612 in step 1110. In steps 1108 and 1110, the read elements indicate request information and response information stored in the FIFO buffers 612 and 616, respectively.

The comparator 614 determines in step 1112 whether functions of the read elements are equivalent. The phrase 'determining whether functions of the read elements are equivalent' as used herein refers to comparing the request information and response information extracted by the TL model protocol analyzer 608 and the RTL model protocol analyzer 610 and pushed into the FIFO buffers 612 and 616. The comparator 614 compares the request information extracted and pushed by the RTL model protocol analyzer 610 with the request information extracted and pushed by the TL model protocol analyzer 608, and compares the response information extracted and pushed by the RTL model protocol analyzer 610 with the response information extracted and pushed by the TL model protocol analyzer 608. In this manner, the comparator 614 compares the element functions in FIGS. 11A and 11B.

The comparator 614 determines in step 1114 whether the two elements are equivalent in function, and if it is determined that the two elements are equivalent in function, the comparator 614 reports the function equivalence between the two elements to the user by means of the display 618. After determining the function equivalence between the two elements in step 1114, the comparator 614 calculates cycle accuracy using Equation (1) and Equation (2) in step 1116.

The comparator 614 determines in step 1118 whether Index_RTL of the RTL FIFO buffer 616 is '0'. If it is determined in step 1118 that Index_RTL is not '0', the comparator 614 proceeds to step 1120 where it reports the function inequivalence between the elements preceding Index_RTL in the RTL FIFO buffer 616, to the user by means of the display 618. However, if the results of the TL simulator and the RTL simulator are fully consistent, Index_RTL should always be '0' in step 1118. In other words, if Index_RTL is not '0', it means that an element inequivalent to that of the TL simulator is included in the result of the RTL simulator. Therefore, the comparator 614 reports this element to the user.

However, if Index_RTL is '0' in step 1118, the comparator 614 determines in step 1122 whether Index_TL is '0'. If it is determined in step 1122 that Index_TL is not '0', the comparator 614 proceeds to step 1124 where it reports the function inequivalence between the elements preceding Index_TL in the TL FIFO buffer 612, to the user by means of the display 618. However, if the results of the TL simulator and the RTL simulator are fully consistent, Index_TL should also always be '0' in step 1124. In other words, if Index_TL is not '0', it means that an element inequivalent to that of the RTL simulator is included in the result of the TL simulator. Therefore, the comparator 614 reports this element to the user.

In step 1126, the comparator 614 pops all elements of up to Index_RTL and Index_TL from the RTL FIFO buffer 616 and the TL FIFO buffer 612.

The comparator 614 determines in step 1128 whether an Index_TL parameter has been counted up to the maximum size of the TL FIFO buffer 612. If it is determined in step 1128 that the Index_TL parameter has been counted up to the maximum size of the TL FIFO buffer 612, the comparator 614 proceeds to step 1132 where it determines whether an Index_RTL parameter has been counted up to the maximum size of the RTL FIFO buffer 616. However, if it is determined in step 1128 that the Index_TL parameter is less than the maximum size of the TL FIFO buffer 612, the comparator 614 increases the Index_TL parameter by '1' in step 1130, and then proceeds to step 1110.

However, if it is determined in step 1132 that the Index_RTL parameter is less than the maximum size of the RTL FIFO buffer 616, the comparator 614 increases the Index_RTL parameter by '1' in step 1134, and then proceeds to step 1106. However, if it is determined in step 1132 that the Index_RTL parameter is equivalent to the maximum size of the RTL FIFO buffer 616, the comparator 614 proceeds to step 1100.

The description has been made of the proposed method and apparatus for verifying the simulation models using the RTL model and the TL model for the system realized with a single chip and a single system in a SoC design.

Figure 12:
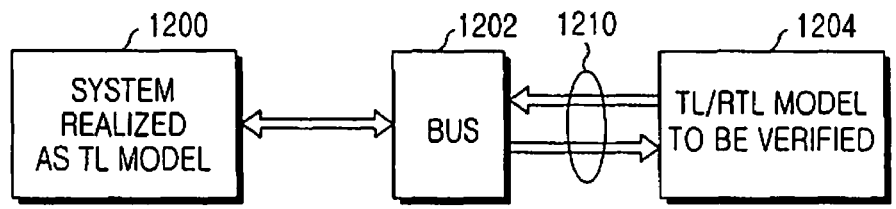
FIG. 12 illustrates verification points for verifying the model realized from the standpoint of the system according to the first embodiment of the present invention.

The present invention performs the verification based on the protocol to verify equivalence between the RTL model and the TL model having various abstraction levels. With reference to FIG. 12, a description will now be made of the verification environment for the proposed method of verifying the simulation models according to an embodiment of the present invention. The foregoing embodiment of the present invention can, based on the protocol, measure the equivalence and verify the cycle accuracy and the accuracy characteristic of the TL model.

FIG. 12 illustrates verification points for verifying the model realized from the standpoint of the system according to the first embodiment of the present invention.

In FIG. 12, reference numeral 1200 indicates a system realized as a TL model, and is a master such as a Central Processing Unit (CPU), and reference numeral 1204 indicates an RTL or TL model desired to be verified, and is a slave such as a memory. Reference numeral 1202 indicates a bus for communication between the master 1200 and the slave 1204.

In the foregoing embodiment, because the number of abstraction levels of the master, or the system 1200 realized as a TL model, is one, the request signal being input to the model 1204 desired to be verified, via the bus 1202, is always equal. Therefore, it is possible to perform verification on the slave 1204 by comparing only the responses to the request, output from the model 1204 desired to be verified.

That is, by checking input/output of the model 1204 desired to be verified at a point indicated by reference numeral 1210, it is possible to determine whether the two models have the equivalent results by comparing at the point 1210 the response signals output by the models realized as the RTL/TL models for the signals input from the master 1200 realized as the TL model. In FIG. 12, the above comparison process is performed on the signals at the point 1210, which are input to the TL model waveform reader 604 and the RTL model waveform reader 606 as waveforms.

In other words, the foregoing embodiment has performed the verification only on the slave realized as the TL model for the case where the number of masters is 1.

However, the TL model can be designed with various abstraction levels. Therefore, there is a new demand for a protocol-based verification method for verifying the RTL model and the TL model in the system having various abstraction levels.

In addition, as the performance and complexity required by the system increases due to the development of the process technology, there is an increasing demand for the multi-processor systems including several processors during SoC design. Beyond the multi-processor systems the simply include several processors, the existing independent systems are recently integrated into one system, and such a system will be referred to herein as an 'integrated system'.

Therefore, there is a need for a method of verifying the models for the integrated systems. However, the foregoing embodiment, which verifies only the models in the single-processor system, cannot accommodate various abstraction levels in the verification of the multi-processor systems and the integrated systems recently required by the SoC industry.

A description of these problems will be made with reference to FIG. 13.

The embodiment of FIG. 12, a method for verifying only the models in the single-processor system, cannot accommodate various abstraction levels in the verification of the multi-processor systems and the integrated systems recently required by the SoC industry. In the integrated multi-processor system, the processors may have different abstraction levels. Unlike the RTL model, the TL model having various abstraction levels is equal to the RTL model in the entire operation as shown in FIG. 14, but may cause different operation orders. In this case, the embodiment may mismeasure the equivalence of the masters 1302 and 1304 desired to be verified of FIG. 13. This is because the foregoing embodiment has never considered the multiple processors that can perform independent operations.

The foregoing first embodiment focus only on the TL model desired to be newly designed, and integrates the existing systems or processors having various abstraction levels, so it is not suitable for verification of the TL model design for the new system.

Figure 13:
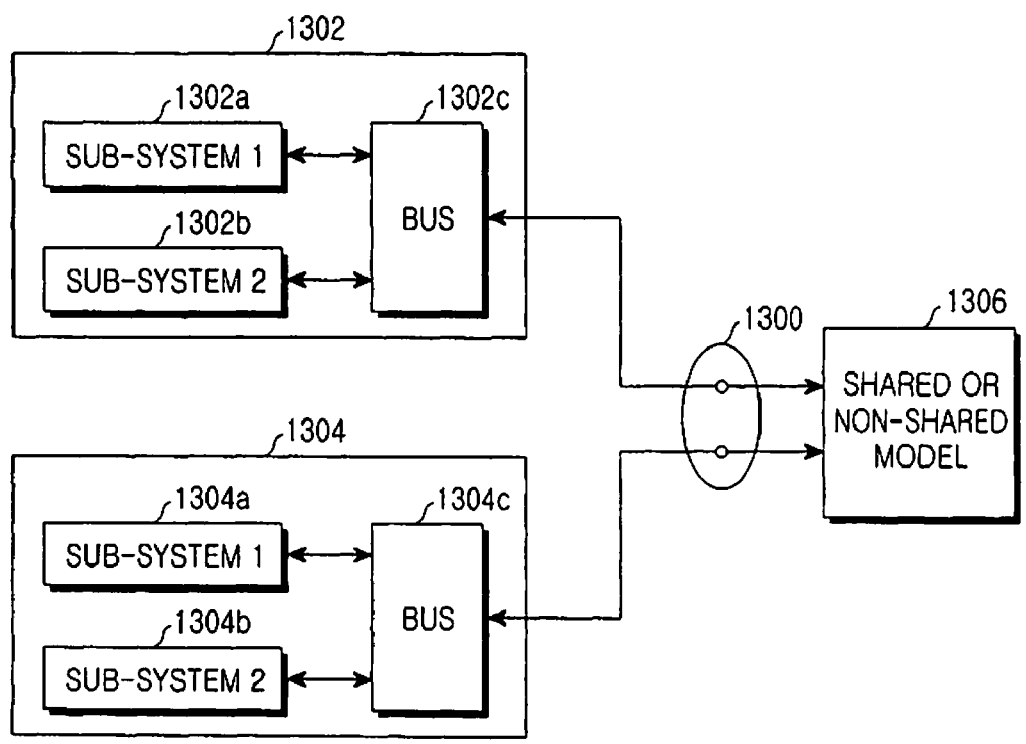
FIG. 13 illustrates an exemplary method for verifying a TL model in an integrated system according to a second embodiment of the present invention.
Figure 14:
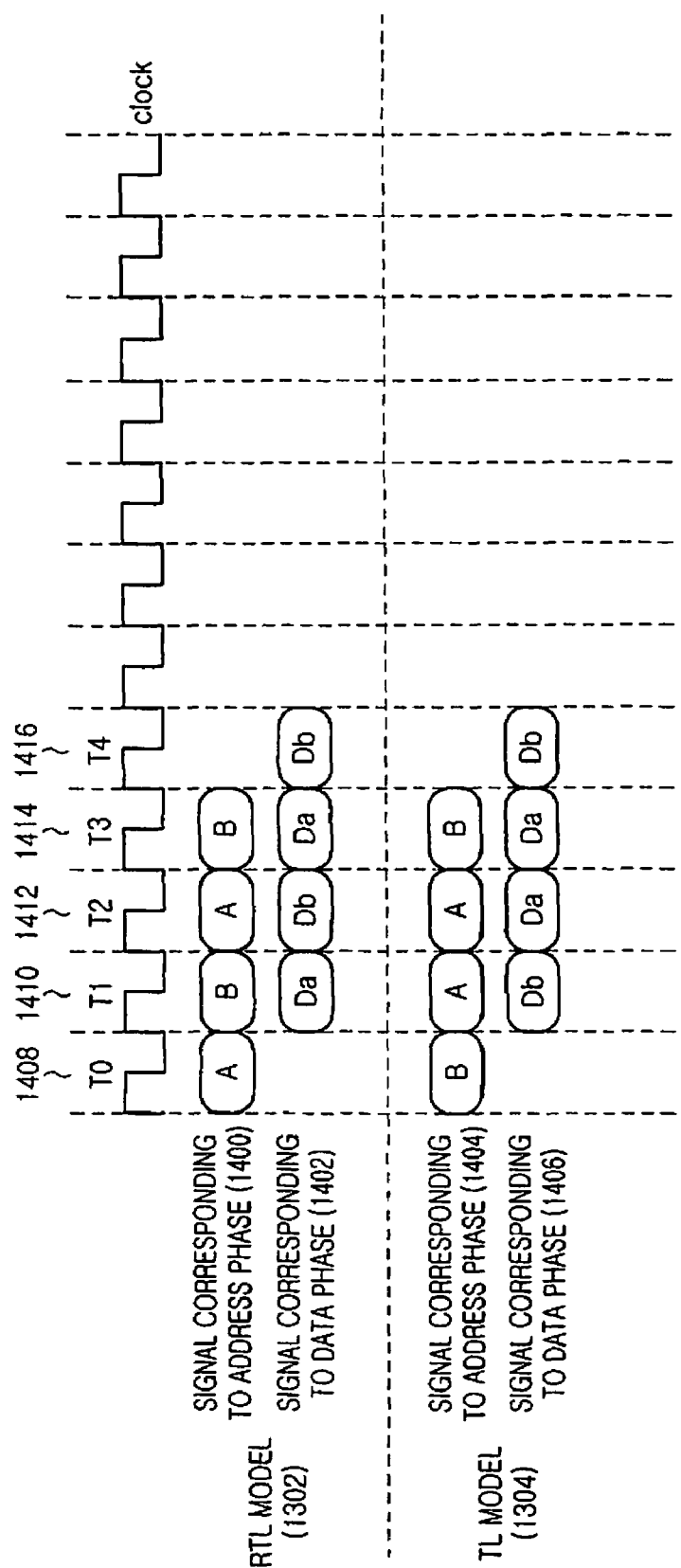
FIG. 14 illustrates an exemplary equivalence error generated in the integrated system of FIG. 13 in the embodiment of FIG. 12.

With reference to FIG. 13, a description will now be made of a verification method for the TL model having various abstraction levels according to a second embodiment of the present invention.

FIG. 13 illustrates an exemplary method for verifying a TL model in an integrated system according to the second embodiment of the present invention. A description will now be made of a difference between FIG. 13 and FIG. 12.

As described above, the embodiment of FIG. 12 can verify the equivalence and the cycle accuracy of the RTL/TL models by performing simulation modeling for verification of the single system. However, the embodiment is an integrated system composed of several systems, and when the systems are realized back into the integrated system having various abstraction levels, the integrated system can hardly undergo accurate verification with the foregoing method.

Because the system of FIG. 12 is the master 1200 that always has the equivalent abstraction level, the system can perform the comparison only on the signals output from the slave 1204. However, the integrated systems of FIG. 13, each having more than two sub-systems and a bus, have various abstraction levels and different timings when they are realized as the TL model, so they cannot perform accurate verifications.

Therefore, as an alternative method of the foregoing embodiment, there is a need for a method for verifying a model of the integrated system having various abstraction levels.

In FIG. 13, reference numeral 1302 indicates an integrated system modeled as an RTL model, reference numeral 1304 indicates an integrated system modeled as a TL model, reference numeral 1306 indicates a shared or non-shared model, and reference numeral 1300 indicates the point at which the verification according to an embodiment of the present invention is performed. Alternatively, reference numerals 1302 and 1304 indicate master devices such as the CPU, and reference numeral 1306 indicates a slave device such as the memory. The present invention creates an integrated system using the previously realized TL model, and compares it with the RTL model, for verification.

In FIG. 13, sub-systems #1 1302*a* and 1304*a* and sub-systems #2 1302*b* and 1304*b* are separate systems. For convenience, the core of the sub-systems #1 1302*a* and 1304*a* will also be referred to as a CPU-A, the core of the sub-systems #2 1302*b* and 1304*b* will also be referred to as a CPU-B, and the sub-system #1 and the sub-system #2 are assumed to have different abstraction levels.

That is, FIG. 13 shows that sub-systems #1 1302*a* and 1304*a*, sub-systems #2 1302*b* and 1304*b*, and buses 1302*c* and 1304*c* are integrated, and modeled as RTL/TL models, and the TL model has various abstraction levels. The shared model in reference numeral 1306 is modeled such that it can be simultaneously accessed by the sub-systems CPU-A and CPU-B, and the non-shared model is not modeled as such.

In the integrated system of FIG. 13, when the masters each are realized with several independent systems, unlike in FIG. 12, the present invention described below performs verification thereon, and when the masters each have several abstraction levels, the present invention performs verification on the integrated system by comparing them with the systems previously realized as the RTL/TL models.

A description will now be made of a method and apparatus for verifying modeling in the integrated system described in FIG. 13 according to the second embodiment of the present invention.

In the following description, the second embodiment of the present invention checks and verifies the equivalence between the RTL model and the TL model of the system into which several processors or sub-systems are integrated. The second embodiment of the present invention makes up for the defect that the first embodiment cannot check the equivalence between the RTL model and the TL model of the integrated system configured by integrating sub-systems having various abstraction levels, thereby efficiently measuring cycle accuracy of the multi-processor system. In the multi-processor system, because it can be considered that the processors constitute each sub-system, the multi-processor situation will be referred to as the integrated system in the following description.

Generally, many systems are designed and verified with various abstraction levels. This is because when the systems are designed with the TL model, the characteristics and purposes required by the systems are different. In the case where the existing systems are integrated into one system, because TL models of the systems are different from each other in terms of the abstraction level, there is a difficulty in comparing and verifying the RTL model and the TL model of the configured system.

In the verification performed by the first embodiment, when independent parallel processors access the shared resources, the TL model can access the shared resources in the different order from that of the RTL model. This can happen when the TL model intends to access the shared resource model 1306 through the point 1300 of FIG. 13. In order to solve the defects and verify the integrated system designed in the conventional scheme, it is necessary to modify the bus or the TL model so that the processors may access the bus in the same order as the RTL model. In particular, when several scenarios can be considered for the operations of the sub-systems each gaining access over the bus, the TL model is necessary to modify a part of the bus or the TL model for every scenario so that it may make the access in the same order as the RTL model, making it difficult to perform wide verification, and the modification of the TL model and the bus may affect not only the performance of the system but also the design of the entire integrated system, causing considerable problems. In particular, this scheme cannot make the best use of the advantage of the TL model that intends to increase the simulation speed and reduce the development term, possibly causing an increase in the verification term compared to the RTL model-based simulation and architecture exploration.

The second embodiment of the present invention, described below, will focus on the method of configuring the multi-processor or multi-system integrated system to solve the problems in the foregoing embodiment. When the integrated system is designed by integrating the existing TL models having various abstraction levels, the sub-systems or processors should be taken into consideration, and when they access the shared resources or non-shared resources over the bus or other communication protocol, the information generated by the processors using the processor information is classified.

The second embodiment of the present invention can be applied according to various bus protocols. For convenience, however, the second embodiment of the present invention will be described based on the AMBA protocol.

In FIG. 13, when the sub-systems 1302a, 1302b, 1304a and 1304b access the buses 1302c and 1304c, the sub-systems acquire the right of the buses and then access the protocol determined for the buses. When N sub-systems acquire the right for the buses and access the shared or non-shared model 1306, the corresponding operation can be classified separately for each sub-system. In addition, AMBA provides an address phase in which an address and a control signal are delivered on the bus protocol, and a data phase in which the data for the generated address is transmitted, and the access for the shared or non-shared model made by each sub-system can be classified separately for the address phase and the data phase.

FIG. 14 illustrates an exemplary equivalence error generated in the integrated system of FIG. 13 in the embodiment of FIG. 12.

Figure 15:
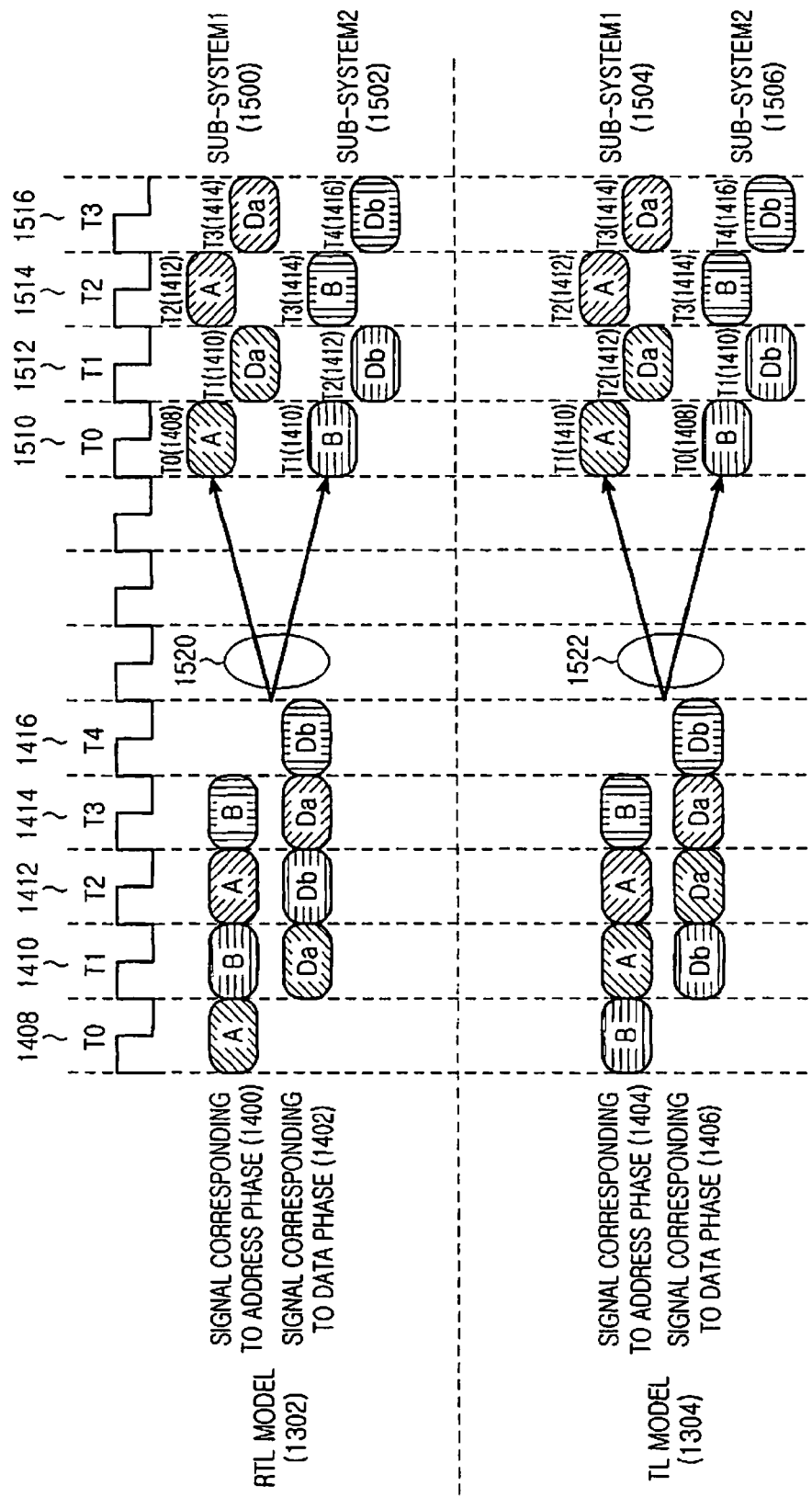
FIG. 15 illustrates a method for performing equivalence check between a TL model having two abstraction levels and an RTL model according to the second embodiment of the present invention.

When performing equivalence check on the operation of FIG. 14, the first embodiment determines that the operation is erroneous at time T0 1408 and time T1 1410. Therefore, by separating the accesses to the shared or non-shared model of the multi-processor or multi-system integrated system separately for each sub-system and performing equivalence check on each of them based on the protocol in order to overcome the above limitations, it is possible to determine that the RTL model and the TL model keep the equivalence as shown in FIG. 15.

As the present invention uses AHB among the bus protocols as described above, the signals obtainable during address phases 1400 and 1404 in FIG. 14 are the above-described request and request information, and the signals obtainable in data phases 1402 and 1406 are the above-described response and response information, and when the AHB bus is not used, the signals obtainable during the address phases and the data phases are subject to change.

Herein, the term 'address phase' will be used in the meaning of request and request information, and the term 'data phase' will be used in the meaning of response and response information. Further, as the second embodiment of the present invention uses AHB, the request and request information will be referred to as 'request information', and the response and response information will be referred to as 'response information'.

In FIG. 14, T0 1408 indicates the time for which a CPU-A (sub-system #1) of the integrated system 1302 modeled as an RTL model (hereinafter referred to as an 'RTL model') accesses the shared or non-shared model 1306, which is a slave, and T1 1410 indicates the time for which a CPU-B (sub-system #2) of the RTL model 1302 accesses the shared or non-shared model 1306, and also indicates the time for which the CPU-B makes a response to the request received from the CPU-A in time T0. The shared or non-shared model 1306, which is a slave model, can be representative of a memory. In the RTL model 1302 of FIG. 14, the CPU-A and CPU-B send request and request information to the slave and receive response and response information from the slave in response thereto during time T0 1408 to time T4 1416.

In addition, the signal corresponding to the address phase will be used in the meaning of the request and request information, and the signal corresponding to the data phase will be used in the meaning of the response and response information. Further, for convenience, the request and request information will be referred to as 'request information', and the response and response information will be referred to as 'response information'.

In the integrated system 1304 modeled as an TL model (hereinafter referred to as a 'TL model') of FIG. 14, because a CPU-A accesses the shared or non-shared model 1306 in time T1 1410 after a CPU-B first accesses the shared or non-shared model 1306 in time T0 1408, the shared or non-shared model 1306 makes a response to the CPU-B in the time T1 1410.

In comparing the data phase and the address phase of FIG. 14 in the manner of FIG. 12, it is determined that there is an equivalence error in the simulation result of the TL model due to the order inconsistency between the request signal corresponding to the address phase and the response signal corresponding to the data phase of the RTL model 1302, and the request signal corresponding to the address phase and the response signal corresponding to the data phase of the TL model 1304. Actually, however, from the standpoint of the entire operation, even though operations of the CPU-A and the CPU-B are consistent with each other, the data phase and the address phase are different in their clock timings T0 1408 to T4 1416, causing an error that it is determined that the integrated system realized as the TL model is different from the integrated system realized as the RTL model.

That is, the RTL model and the TL model operate even though they are inconsistent in timing. However, regarding the timings, the order in which a particular master (CPU-A or CPU-B) actually accesses the slave can undergo a change. For example, it can be appreciated in FIG. 14 that the access orders are changed such that the CPU-B accesses the slave (or memory) after the CPU-A first accesses the slave in the RTL model 1302, whereas the CPU-A accesses the slave after the CPU-B first accesses the slave in the TL model 1304.

In this case, when the masters access the slave, the data output from the slave may be different, causing an error. However, because the slave's responses to the requests from the masters of the RTL model and the TL model are consistent with each other, the error may be disregarded. In this case, however, the foregoing embodiment reports the error, determining that there is an error in the TL model.

Figure 16:
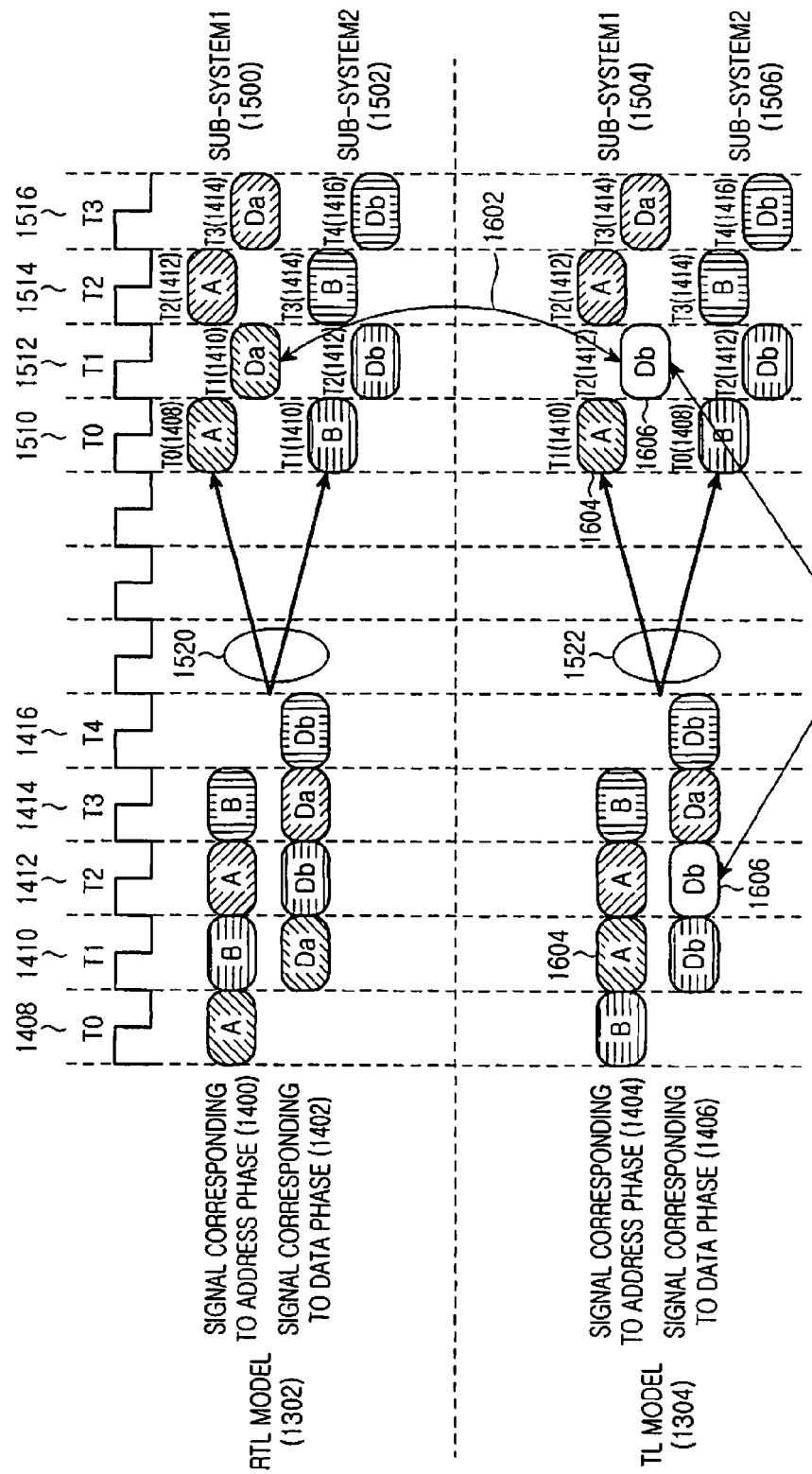
FIG. 16 illustrates a method for detecting data inconsistency and equivalence error between a TL model having two abstraction levels and an RTL model according to the second embodiment of the present invention.

In FIGS. 15 and 16, the address phases and the data phases are subdivided even for the sub-systems. Therefore, when the protocol-based equivalence check is performed in time T1 indicated by reference numeral 1512 of FIG. 16, it is noted, regarding reference numeral 1606, that the address phase is consistent in operation but an error occurs in the data phase. If the corresponding address region is a shared region, data inconsistency is reported, and if the corresponding address region is a non-shared region, equivalence error is reported.

Through this process, in the second embodiment of the present invention, the integrated system can trace the inconsistency situation of the shared resources of the RTL model and the TL model, facilitating debugging. In this case, if the address phases have different values during the equivalence check, an equivalence error occurs.

FIG. 15 illustrates a method for performing equivalence check between a TL model having two abstraction levels and an RTL model according to the second embodiment of the present invention.

To solve the problems mentioned in FIG. 14, it is necessary to divide the masters. For example, in the case of AHB, for the bus mastering signal such as a bus grant which is information related to the right by which the masters access the slave over the bus, AXI can divide the sub-systems by dividing the masters using signals such as a transaction ID.

That is, in FIG. 15, assuming that the present invention uses the AMBA protocol, because there are request signals corresponding to the address phase and response signals corresponding to the data phase, the second embodiment of the present invention can verify the simulation results on the masters of the TL models having several abstraction levels by distinguishing the masters depending on the mastering information such as the information as to which sub-system, i.e., which master, has requested the request signal.

In the second embodiment of the present invention, when the requests and the responses are divided separately for each sub-system, the type of the requests is data access, and when access is made to the shared region, the embodiment determines whether the responses of the RTL model and the TL model are equal or different. When the responses are different, it is determined that data inconsistency has occurred. However, in the first embodiment, after the requests are detected, when the addresses are equal and the data is different, it is determined that an error has occurred.

That is, the second embodiment of the present invention based on FIG. 15 divides the requests and responses modeled as RTL/TL models into sub-systems #1 1500 and 1504 and sub-systems #2 1502 and 1506 as shown by reference numeral 1520 and reference numeral 1522 in FIG. 14, extracts the requests (signals corresponding to the address phase) and responses (signals corresponding to the data phase) every clock, stores them into FIFO buffers, and compares the requests and responses stored in the FIFO buffers separately for each of the sub-systems of the RTL model and the TL model, thereby making it possible to perform equivalence check between the TL model and the RTL model of the integrated system.

In FIGS. 15 and 16, among the signals corresponding to the address phase and the data phase before the division into the sub-systems, the signals being equivalent to the signals corresponding to the address phase and the data phase after the division into the sub-systems are hatched in the same way. More specifically, the clocks indicated by reference numerals 1510 to 1516 are the clocks for the case where the requests and the responses are extracted and divided by the sub-systems as in the second embodiment of the present invention. In FIG. 15, it is possible to divide the data phases and the address phases separately for each sub-system and also obtain the clock timing information for the data phases and the address phases. It can be appreciated in FIG. 15 that the T0 clock indicated by reference numeral 1510, which includes the signals corresponding to the address phases of the sub-systems, indicates that the results of the RTL model divided separately for each sub-system as shown by reference numeral 1520 and the results of the TL model divided separately for each sub-system as shown by reference numeral 1520 are equivalent to each other for each sub-system. Similarly, even for reference numerals 1512 to 1516, the results of the RTL model and the results of the TL model are equal to each other for each sub-system. It can be noted from FIG. 15 that before the division into the sub-systems according to the second embodiment of the present invention, the signals for the address phases and the data phases of the RTL model 1302 and the TL model 1304 generated every clock are different at every clock. However, because this happens simply due to the inconsistency of the orders in which the multiple sub-systems sequentially access the slave region over the bus, it cannot be considered that an error has occurred in the TL model 1304.

FIG. 16 illustrates a method for detecting data inconsistency and equivalence error between a TL model having two abstraction levels and an RTL model according to the second embodiment of the present invention. It can be noted from FIG. 16 that at time T0 indicated by reference numeral 1408, the signal corresponding to the address phase of the sub-system #1 (CPU-A) is output in the RTL model 1302, and the signal corresponding to the address phase of the sub-system #2 (CPU-B) is output in the TL model 1304. Further, at time T1 indicated by reference numeral 1410, the signal corresponding to the address phase of the sub-system #2 (CPU-B) and the signal corresponding to the data phase of the CPU-A are output in the RTL model 1302, and the signal corresponding to the address phase of the sub-system #1 (CPU-A) and the signal corresponding to the data phase of the CPU-B are output in the TL model 1304.

However, for time T2 indicated by reference numeral 1412, the signal corresponding to the address phase of the CPU-A and the signal corresponding to the address phase of the CPU-B are output in the RTL model 1302, and the signal corresponding to the address phase of the CPU-A and the signal corresponding to the data phase of the CPU-B are output in the TL model 1304. In this case, for the time T2 indicated by reference numeral 1412 in the TL model 1304, because the signal corresponding to the address phase of the CPU-A was generated in the previous time indicated by reference numeral 1410, the signal corresponding to the data phase of the CPU-A of the TL model 1304 should be generated. However, as the signal corresponding to the data phase of the CPU-B is generated, an error has occurred. In this manner, the second embodiment of the present invention can perform a verification on the TL model by detecting an error which may occur when TL-modeling the systems in which the sub-systems are integrated, by way of comparing the signals corresponding to the address phase with the signals corresponding to the data phase separately for each sub-system as shown by reference numerals 1520 and 1522.

It can be determined in FIG. 16 that for the time T2 1412, because a request 1400 and a response 1402 thereto of the RTL model 1302, and a request 1404 and a response 1406 thereto of the TL model 1304 are different from each other, data inconsistency has occurred. This is because, at the time T1 1410 of the TL model 1304, an address phase 1404 is the CPU-A as shown by reference numeral 1604, and for a data phase therefor, a response for the CPU-B is output at the time T2 1412 as shown by reference numeral 1606. In other words, if the RTL model and the TL model are consistent with each other in terms of the values of the address phase (request information consistency) but different from each other in terms of the data phase (response), it represents data inconsistency.

If the RTL model and the TL model make the equivalent requests, the requests are for data access, and the desired part where the data access is made is the shared part, then the second embodiment of the present invention determines for more accurate operation that data inconsistency rather than the simple equivalence error has occurred.

Because the simultaneous access to the shared region by several masters (CPUs) may cause a change in data access order (or data access sequence), further consideration should be given to the algorithm that makes the masters in the RTL model and the TL model be equal in their access sequence.

In FIG. 16, reference numeral 1602 shows that as the RTL model 1302 and the TL model 1304 receive different responses to the same requests, an error has occurred. As to reference numeral 1600, the error indicated by reference numeral 1602 will be described separately for the data phase and the address phase in the TL model 1304 according to the second embodiment of the present invention. It can be noted that only the data phase, which is a response to the signal A 1604 of the CPU-A corresponding to the address phase, is Db 1606 and different from the RTL model 1302. It is shown that because a data access command has occurred (assuming that 'A' generated in the address phase is an address of the shared region), it is determined that the Db 1606 is the result due to the data inconsistency error rather than the result due to the general functional error. If the signal A 1604 generated in the address phase were for the non-shared region, the second embodiment of the present invention can determine it as an equivalence error.

It is possible to measure cycle accuracy separately for each sub-system by dividing each of the sub-systems and dividing the address phase and the data phase separately for each sub-system as in the second embodiment of the present invention. In addition, because the operation is divided separately for each sub-system, the occupation rate at which a particular sub-system occupies the bus can be measured, and the part which may most affect the cycle accuracy difference between the TL model and the RTL model can be selected using the occupation rate and the cycle accuracy of the corresponding sub-system. The cycle accuracy of each sub-system can be calculated in the form of FIG. 8. Along with this, the invention calculates a bus occupation rate Pbus_n of each sub-system, and checks the cycle accuracy affected by each sub-system depending on the cycle accuracy and the bus occupation rate.

In the second embodiment of the present invention, there are various possible schemes for measuring the accuracy using the cycle accuracy and the bus occupation rate. As a simple example, the influence that an $n^{th}$ sub-system has on the cycle accuracy of the entire bus can be calculated using Equation (3), and the sub-system having the largest calculated value has the greatest influence on the cycle accuracy of the entire bus.

$$Pbus\_n * (1 - DurationError\_n) \quad (3)$$

In Equation (3), Pbus_n denotes a bus occupation rate of an $n^{th}$ sub-system, and DurationError_n denotes an error rate of average duration of the $n^{th}$ sub-system. Further, 1−DurationError_n has the equivalent meaning to the accuracy, and in the embodiment of the present invention, as a weight is applied to the bus occupation rate Pbus_n, even the sub-systems having the same error rate may be different in the influence on the cycle accuracy, if they have different bus occupation rates.

That is, if a sub-system having an accuracy of 90% occupies the bus at a 50% bus occupation rate, the corresponding sub-system has an influence on the cycle accuracy with a relative value of 0.05 (meaning an error of 5%) for the entire bus system. Mores specifically, the corresponding sub-system has an influence on the cycle accuracy at the error rate of 5%.

The term 'relative value' as used herein refers to, assuming that a sub-system #1 has an error rate of 0.5 and a sub-system #2 has an error rate of 1, a ratio of its own error rate to an error rate of another compared sub-system. For example, it can be understood that the sub-system #1 has an error rate of ½, compared to the sub-system #2, and the relative value is ½. That is, if the sub-system #1 and the sub-system #2 are equal to each other in the bus occupation rate, the sub-system #2 has a double influence on the accuracy of the entire bus system, compared to the sub-system #1.

In the accuracy measurement scheme according to the second embodiment, the accuracy measured on the assumption of the accuracy of 90% (i.e., inaccuracy of 10%) and the 50% bus occupation rate, is 0.1*0.5=0.05, and the accuracy measured on the assumption of the 100% accuracy (i.e., inaccuracy of 0%) and the 50% bus occupation rate, is 0*0.5=0.

However, if another sub-system bus is occupied at an occupation rate of 50%, and the cycle accuracy is 100%, this sub-system has an influence on the cycle accuracy with a relative value of 0 (meaning an error of 0%). In other words, the error rate is 0 (i.e., error of 0%).

That is, the part having a great influence on the cycle accuracy of the entire system is selected using the bus occupation rate of the corresponding master and the cycle accuracy of the corresponding model.

Further, in SoC design, if the cycle accuracy of a particular sub-system of the TL model is known, it is possible to modify the corresponding sub-system such that it can accommodate the simulation environment and the required accuracy, and the integrated system can be entirely analyzed in the TL model.

Base on such information, a particular sub-system, when it has a very low cycle accuracy, helps detect the influence on the cycle accuracy of the entire system. Further, in SoC design, if the cycle accuracy of a particular sub-system of the TL model is known, it is possible to modify the corresponding sub-system such that it can accommodate the simulation environment and the required accuracy, and the integrated system can be entirely analyzed in the TL model, facilitating various architecture analyses.

Figure 17:
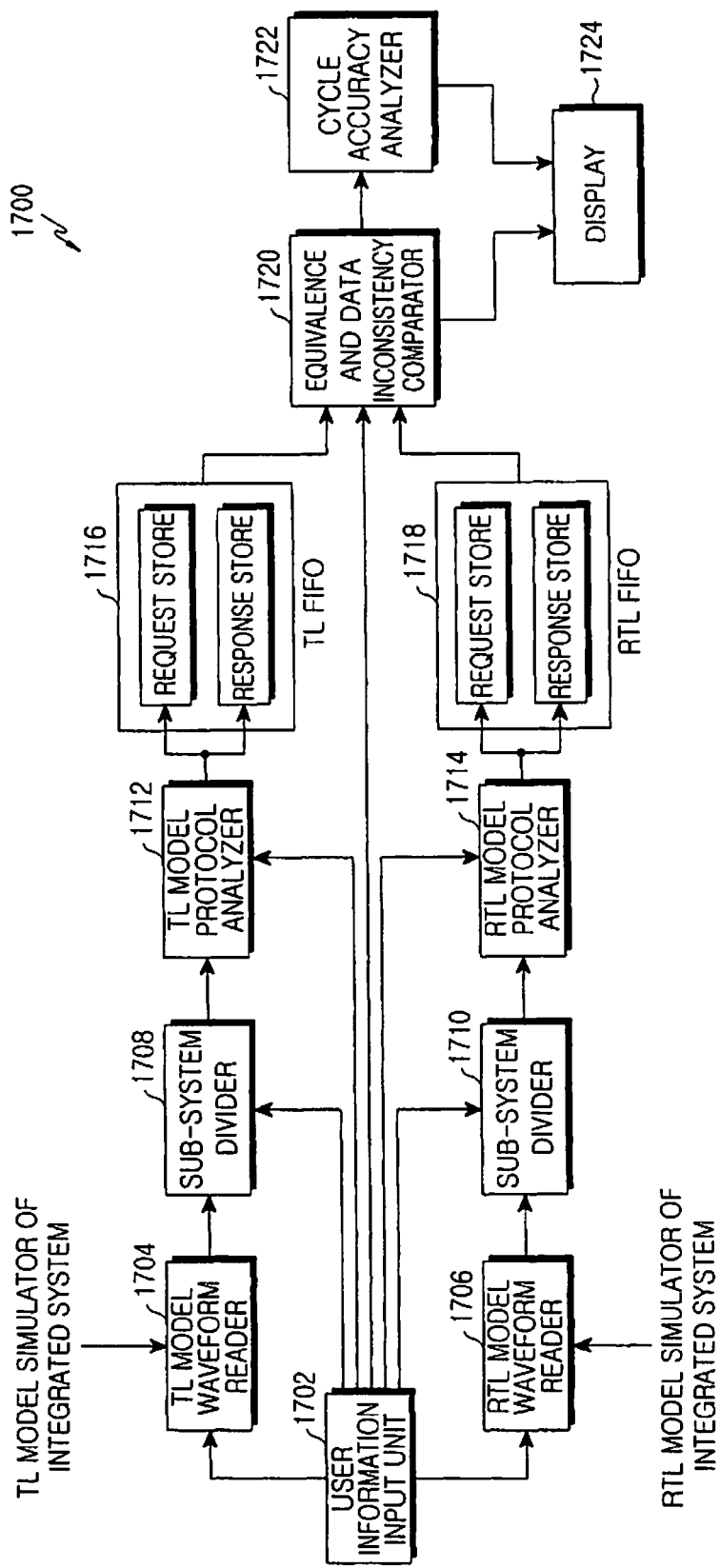
FIG. 17 illustrates a block diagram of a comparison unit for verifying a TL model having at least two abstraction levels in a multi-processor system according to the second embodiment of the present invention.

FIG. 17 illustrates a block diagram of a comparison unit 1700 for verifying a TL model having at least two abstraction levels in a multi-processor system according to the second embodiment of the present invention.

The comparison unit 1700 according to the second embodiment of the present invention performs the verification at the point indicated by reference numeral 1300 in FIG. 13. The TL model waveform reader 604 and the RTL model waveform reader 606 in FIG. 6 read waveforms at the point indicated by reference numeral 1200 of FIG. 12, whereas a TL model waveform reader 1704 and an RTL model waveform reader 1706 in FIG. 17 read the waveforms (request and response) at the point indicated by reference numeral 1300 of FIG. 13.

A user information input unit 1702 sets a file name of the waveform to be read by the TL model waveform reader 1704 and the RTL model waveform reader 1706, and provides information on the file name and signals to be read from the file, to the TL model waveform reader 1704 and the RTL model waveform reader 1706.

Further, the user information input unit 1702 provides sub-system dividers 1708 and 1710 with the information on the sub-systems realized as a TL model and an RTL model, and the bus mastering information necessary for distinguishing the sub-systems, and provides a TL model protocol analyzer 1712 and an RTL model protocol analyzer 1714 with the requests and the responses corresponding to the sub-systems. In addition, the user information input unit 1702 determines which signal it will use as the bus mastering signal, and provides the corresponding information to the TL model waveform reader 1704 and the RTL model waveform reader 1706. Further, the user information input unit 1702 provides even the information used for distinguishing the sub-systems to the sub-system dividers 1708 and 1710, and also provides cycle information, finish cycle and bus occupation time for each of the sub-systems to the TL/RTL model protocol analyzers 1712 and 1714.

Finally, the user information input unit 1702 provides an equivalence and data inconsistency comparator 1720 with information on the shared region and non-shared region for the shared resources accessed by the sub-systems.

For the information that the integrated system uses to determine the access right and the presence/absence of the access for each sub-system, the TL model waveform reader 1704 and the RTL model waveform reader 1706 read waveforms at the point 1300 using the file name provided from the user information input unit 1702. Herein, the information used for determining the access right and access presence/absence of the sub-systems can be the grant information and the master information of the bus in the AMBA system. Further, the TL model waveform reader 1704 and the RTL model waveform reader 1706 read the simulation results of the RTL model and the TL model from the waveform (or Value Change Dump (VCD) file). In this case, the TL model waveform reader 1704 and the RTL model waveform reader 1706 read the set signals from the file name set by the user information input unit 1702 at every clock. In AMBA, because the grant information and the master information of the bus for the waveform can be extracted, the waveform readers extract the information and output the read information to the sub-system dividers 1708 and 1710 in the following stage.

The sub-system dividers 1708 and 1710 separate the accesses to the bus by each sub-system of the integrated system according to the protocol. In this case, the sub-system dividers 1708 and 1710 divide the channel that can be divided in the bus protocol, such as an address phase (request) and a data phase (response), or a control phase, so as to determine in which channel an error has occurred. Further, the sub-system dividers 1708 and 1710 divide an operation separately for each sub-system or processor according to the bus protocol. As described above, in the AMBA system, the sub-system dividers 1708 and 1710 can divide the sub-systems using the bus mastering signal. In addition, the sub-system dividers 1708 and 1710 measure a bus occupation rate of a particular sub-system, so that a cycle accuracy analyzer 1722, described below, can use the measured bus occupation rate.

The TL model protocol analyzer 1712 and the RTL model protocol analyzer 1714 separate the accesses to the bus based on the protocol in association with the sub-system dividers 1708 and 1710. That is, the TL model protocol analyzer 1712 and the RTL model protocol analyzer 1714 distinguish requests and responses according to the sub-systems, and separately push the distinguished requests and responses to a TL FIFO buffer 1716 and an RTL FIFO buffer 1718.

The equivalence and data inconsistency comparator 1720 checks equivalence between the RTL model and the TL model separately for each sub-system, and when an error has occurred, provides the information indicating the timing at which the error has occurred and indicating in which sub-system the error has occurred. Unlike the comparator 614 in the first embodiment, the equivalence and data inconsistency comparator 1720 in the second embodiment divides the requests and the responses, has information on the divided requests and responses, and determines the possibility of the data inconsistency situation which may occur in the multi-processor or multi-system situations, using the information.

In addition, the equivalence and data inconsistency comparator 1720 reports, to the user by means of a display 1724, or other output device, the data inconsistency error which may occur when for the shared region, the address phases or control phases are equivalent but the data phases are different.

The cycle accuracy analyzer 1722 measures cycle accuracy separately for each sub-system after the equivalence and data inconsistency comparator 1720 checks the equivalence and the data inconsistency. The cycle accuracy analyzer 1722 separately analyzes the entire cycle accuracy and the cycle accuracy information between particular sub-systems. That is, the cycle accuracy analyzer 1722 measures cycle accuracy separately for each sub-system, and based on the bus occupation rate, determines which sub-system or processor has a greater influence on the cycle accuracy of the entire integrated system, and at which part the bottleneck phenomenon has occurred.

A detailed description will be made of the meaning of having a greater influence on the cycle accuracy.

For example, assuming that there are two sub-systems and the two sub-systems both have accuracy of 90%, it is possible to determine which sub-system has a greater influence on the cycle accuracy, in the following way.

If a sub-system A occupies 90% of the bus and a sub-system B occupies 10% of the bus, the sub-system A has a greater influence on the cycle accuracy, and an increase in the accuracy of the sub-system A greatly affects the entire bus cycle accuracy.

Figure 18:
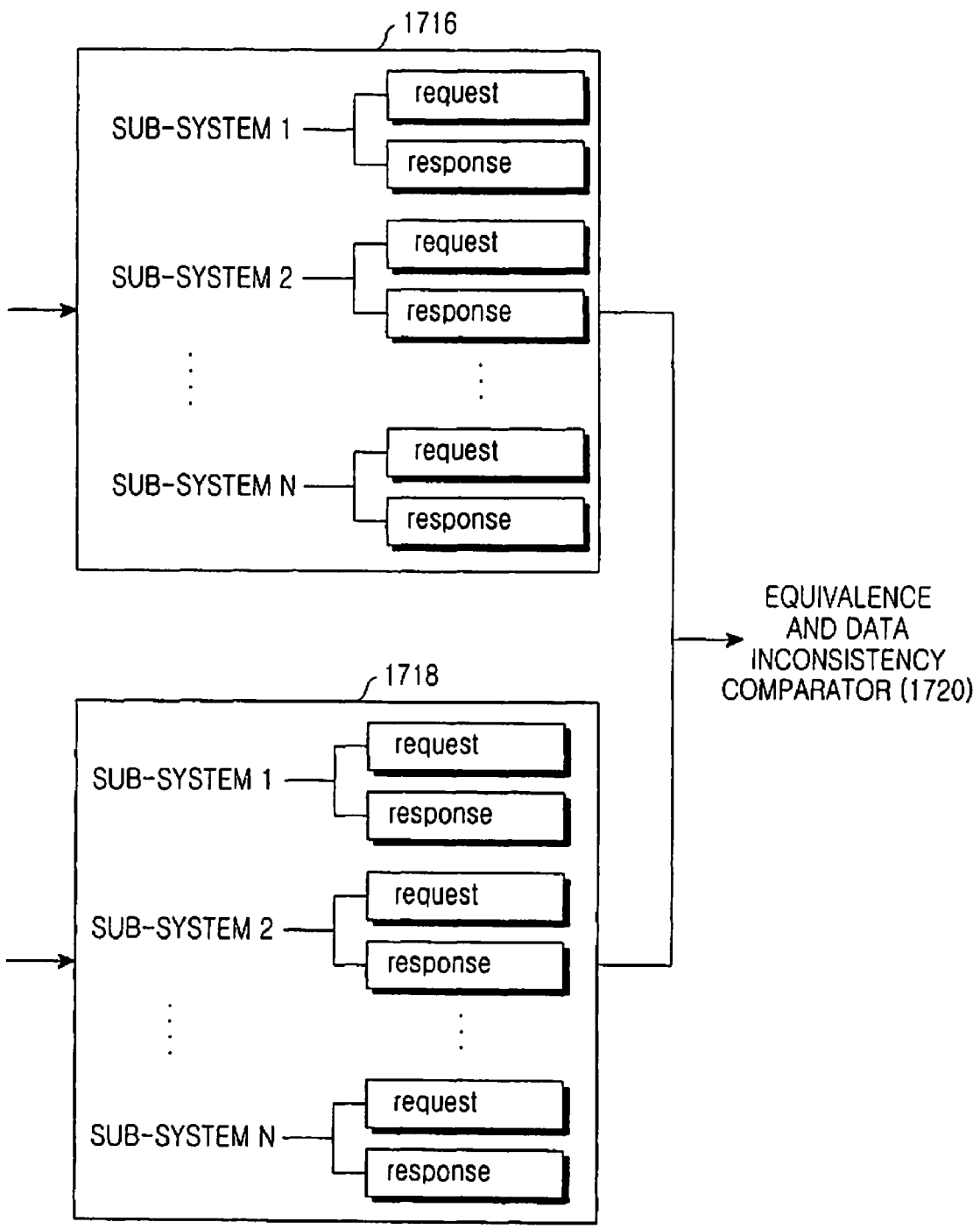
FIG. 18 illustrates a method in which a TL FIFO and an RTL FIFO store requests and responses separately for each sub-system according to the second embodiment of the present invention.

FIG. 18 illustrates a method in which a TL FIFO buffer 1716 and an RTL FIFO buffer 1718 store requests and responses separately for each sub-system according to the second embodiment of the present invention. In the second embodiment of the present invention, because the requests and responses are stored in the TL FIFO buffer 1716 and the RTL FIFO buffer 1718 as shown in FIG. 18, the equivalence and data inconsistency comparator 1720 can easily perform the equivalence check and data inconsistency check separately for each sub-system.

Figure 19:
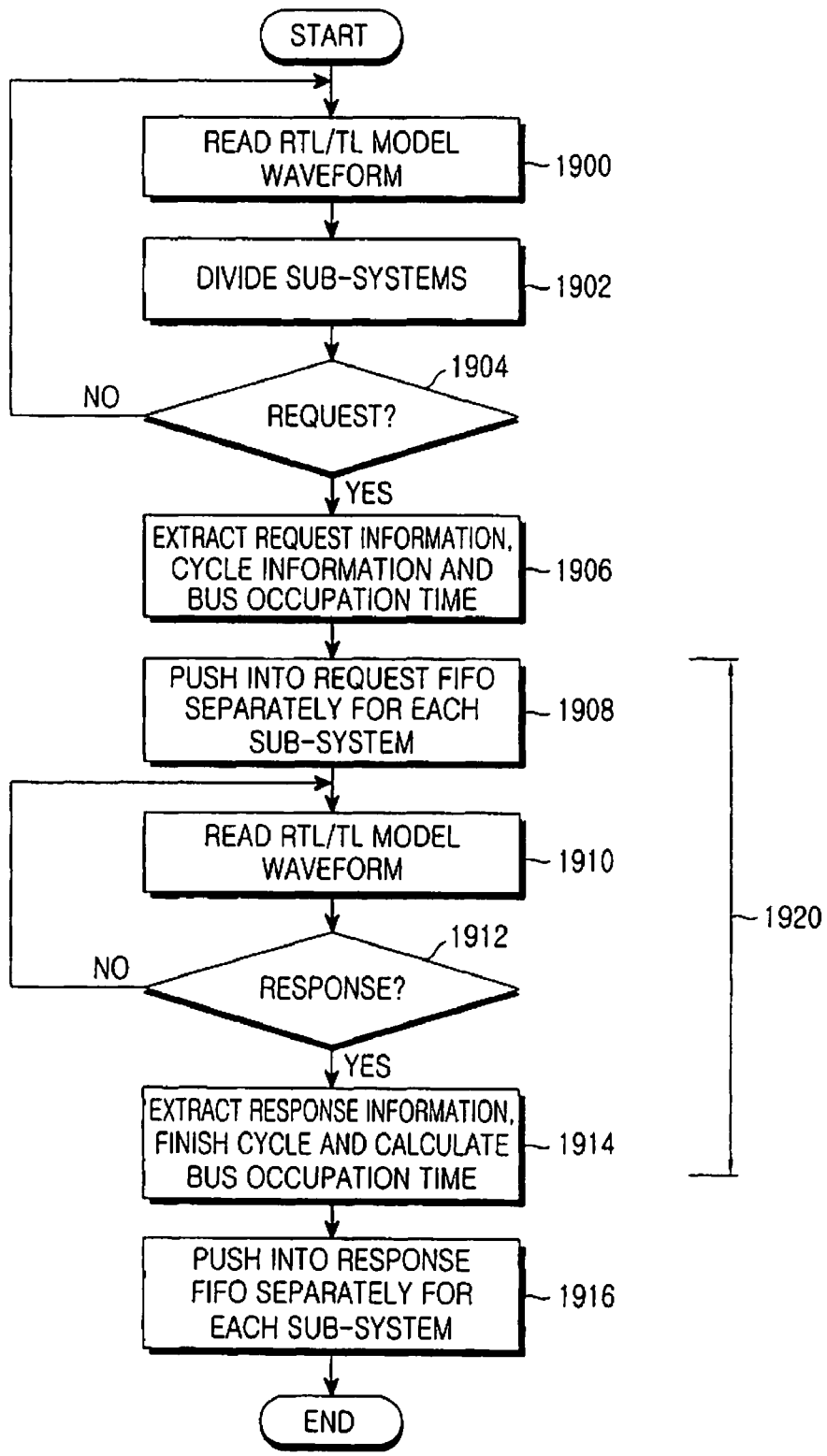
FIG. 19 illustrates an operation of a comparison unit according to the second embodiment of the present invention.

FIG. 19 illustrates an operation of a comparison unit 1700 according to the second embodiment of the present invention.

In step 1900, the comparison unit 1700 reads an RTL/TL model waveform. In step 1902, the comparison unit 1700 divides sub-systems of the RTL/TL models using a bus mastering signal. The comparison unit 1700 determines in step 1904 whether the waveform read in step 1900 is a request. If it is determined in step 1904 that the read waveform is a request, the comparison unit 1700 extracts, in step 1906, the request information, the cycle information and the bus occupation time. In step 1908, the comparison unit 1700 pushes the request-related information, the cycle information and the bus occupation time extracted in step 1906, into a Request FIFO buffer of the RTL/TL FIFO buffer separately for each sub-system. The request-related information includes information (data or function) used for distinguishing the requests and the requests, and request information (including an address of the slave that the master intends to access, a data size to be requested, and the information indicating how many times the corresponding data has been read). The 'information used for distinguishing requests' refers to the information used for distinguishing requests according to whether the address accessed by the master is a slave having data, or a control register having predetermined operations (functions) stored therein. That is, if the address of the slave accessed by the master is simply an address where data is stored, the request of the master will be an operation of reading data from the corresponding slave, and when the request is sent to the control register, the comparison unit 1700 reads or writes a predetermined operation in the control register and performs an operation according thereto.

In step 1910, the comparison unit 1700 reads an RTL/TL model waveform, and determines in step 1912 whether the read waveform is a response. If it is determined in step 1912 that the read waveform is a response, the comparison unit 1700 extracts, in step 1914, the response information and the finish cycle from the waveform read in step 1910, and calculates a bus occupation time of the sub-systems. The calculated bus occupation time is the time for which the bus is occupied by the sub-system from step 1906 to step 1914.

After calculating the response-related information (including information (data or function) used for distinguishing responses and responses, and response information), the finish cycle and the bus occupation time in step 1914, the comparison unit 1700 pushes, in step 1916, the response information, the finish cycle and the bus occupation time into a response FIFO buffer of the RTL/TL FIFO buffer separately for each sub-system.

Figure 20:
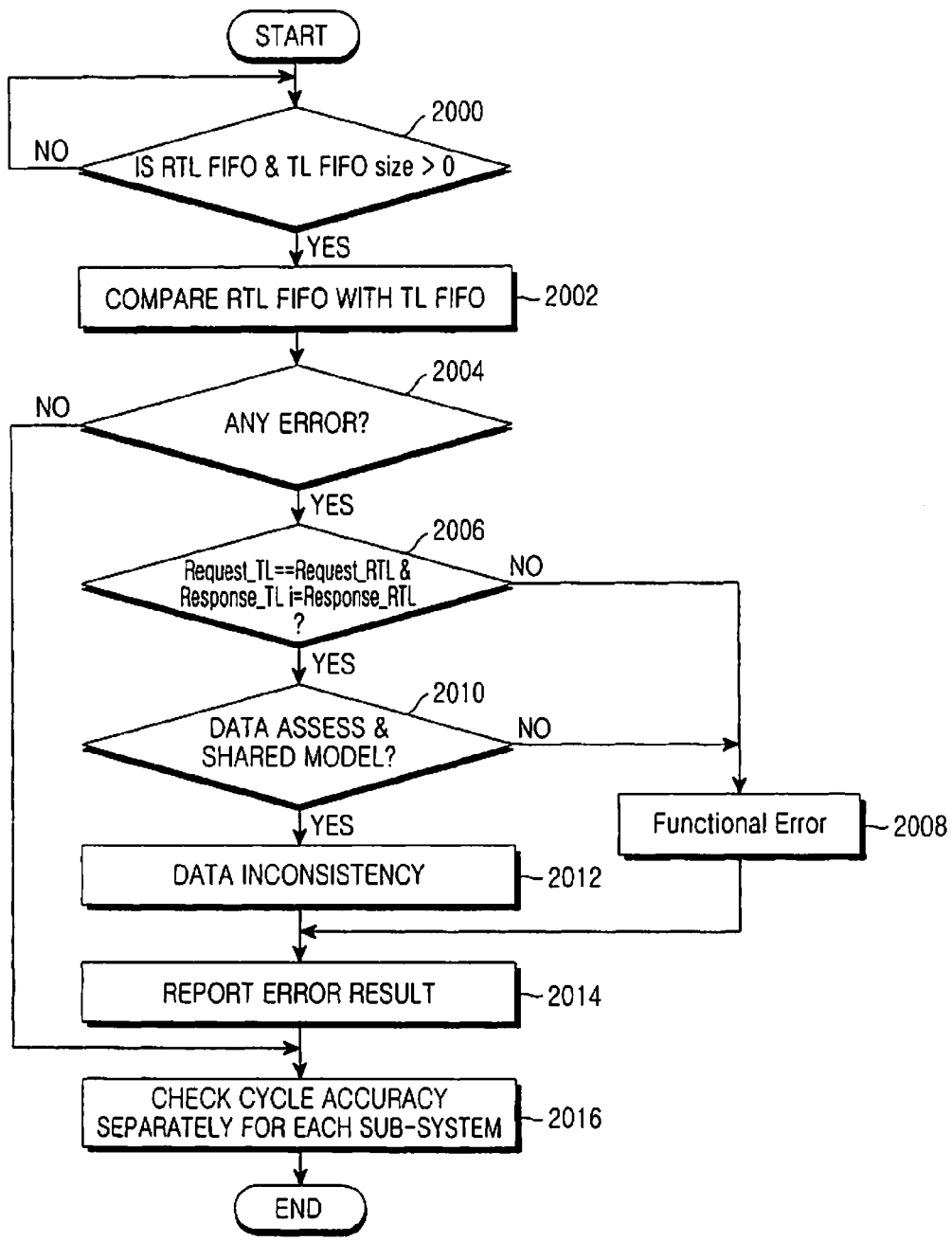
FIG. 20 illustrates a detailed operation of an equivalence and data inconsistency comparator in a comparison unit according to the second embodiment of the present invention.

FIG. 20 illustrates a detailed operation of an equivalence and data inconsistency comparator 1720 in a comparison unit 1700 according to the second embodiment of the present invention.

The equivalence and data inconsistency comparator 1720 determines in step 2000 whether indexes of the TL FIFO buffer 1716 and the RTL FIFO buffer 1718 are greater than '0' as information is pushed into the TL FIFO buffer 1716 and the RTL FIFO buffer 1718.

If it is determined in step 2000 that sizes of the TL FIFO buffer 1716 and the RTL FIFO buffer 1718 are both greater than '0', the equivalence and data inconsistency comparator 1720 proceeds to step 2002 where it compares the information pushed into the RTL FIFO buffer 1718 and the TL FIFO buffer 1716. The comparison can be performed in the method described in the first embodiment.

That is, in step 2002, the equivalence and data inconsistency comparator 1720 determines whether Request_TL is equal to Request_RTL, and Response_TL is equal to Response_RTL, and if they are equal (Request_TL=Request_RTL & Response_TL=Response_RTL), the equivalence and data inconsistency comparator 1720 determines in step 2004 that there is no error, and proceeds to step 2016 where it checks cycle accuracy separately for each sub-system. However, if there is any error, the equivalence and data inconsistency comparator 1720 proceeds to step 2006 where it determines whether the error is caused by data inconsistency, or by a simple functional error.

If it is determined in step 2004 that there is any error as a result of step 2002, the equivalence and data inconsistency comparator 1720 proceeds to step 2006 where it determines whether Request_TL is equal to Request RTL (address phases of TL and RTL are compared), and Response_TL is different from Response_RTL (data phases of TL and RTL are compared). Step 2006 is needed for determining whether the error occurred in step 2004 is caused by data inconsistency or by a simple functional error. Therefore, in step 2006, the equivalence and data inconsistency comparator 1720 compares request-related information of TL and RTL and compares response-related information of TL and RTL, to determine whether they are equal to or different from each other.

If it is determined in step 2006 that the request-related information of TL and RTL is equal to each other and the response-related information of TL and RTL is different from each other, the equivalence and data inconsistency comparator 1720 proceeds to step 2010 where it determines whether the request is for data access and the requested region is for a shared model.

If it is determined in step 2006 that the requests of TL and RTL are not equal to each other and the responses of TL and RTL are not different from each other, and if it is determined in step 2010 that the request is not for data access and the requested region is not for a shared model, the equivalence and data inconsistency comparator 1720 proceeds to step 2008 where it reports information indicating a simple functional error.

However, if it is determined in step 2010 that the request is for data access and the requested region is for a shared model, the equivalence and data inconsistency comparator 1720 determines data inconsistency in step 2012, and reports the error result indicating the occurrence of the data inconsistency in step 2014.

This is because the error caused by the data inconsistency can occur only for the case where the slave is the shared region, and because the error for the case where the slave is not the shared model and the request is not the data access of the master for the slave, is caused by any functional error.

In step 2016, the cycle accuracy analyzer 1722 checks cycle accuracy separately for each sub-system. The cycle accuracy calculation performed in step 2016 by the cycle accuracy analyzer 1722 can calculate the cycle accuracy by defining a weight according to a bus occupation rate separately for each processor or separately for the entire system.

The cycle accuracy analyzer 1722 calculates cycle accuracy of the sub-systems in the RTL model and the TL model, and selects the sub-system having the greatest influence on the entire system using the bus occupation rate and the cycle accuracy of the sub-systems.

As is apparent from the foregoing description, the present invention can accurately detect equivalence between the RTL model and the TL model having various abstraction levels in the integrated system, and can detect the data inconsistency and the equivalence error. In addition, the present invention analyzes the cycle accuracy separately for the entire system or separately for each sub-system, making it possible to configure the efficient integrated system environment with the TL model.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing verification on a Transaction Level (TL) model having at least two abstraction levels in simulation modeling for design of a System-on-Chip (SoC), the method comprising:

acquiring, by a Register Transfer Level (RTL) reader, from an RTL waveform indicating a simulation result on an RTL model, first request information of at least two sub-systems modeled as the RTL model during the SoC design, and first response information output from first slave models that have received the first request information;

acquiring, by a TL waveform reader, from a TL waveform indicating a simulation result on the TL model, second request information of at least two sub-systems modeled as the TL model, and second response information output from second slave models that have received the second request information;

dividing, by a sub-system divider, the first and second request information and the first and second response information separately for each of the sub-systems, using bus mastering information related to a right to access a slave model over a bus by the sub-systems, acquired from the TL waveform and the RTL waveform;

comparing, by an equivalence and data inconsistency comparator, the divided first and second request information with each other and comparing the divided first and second response information separately for the sub-systems of the RTL model and the sub-systems of the TL model; and verifying, by the equivalence and data inconsistency comparator, a modeling result on the TL model depending on the comparison results.

2. The method of claim 1, wherein the verifying of a modeling result on the TL model comprises:

reporting an equivalence error as the modeling result, if the first request information and the second request information are equal to each other, the first response information and the second response information are different from each other, and the slave model is a memory of a non-shared region.

3. The method of claim 1, wherein the verifying of a modeling result on the TL model comprises:

reporting an occurrence of a data inconsistency situation as the modeling result, if a type of the first and second request information is data access, the first request information and the second request information are equal to each other for each sub-system, the first response information and the second response information are different from each other for each sub-system, and the slave model is a memory of a shared region.

4. The method of claim 1, wherein the bus mastering information is bus grant information.

5. The method of claim 1, further comprising:

selecting a sub-system having a greatest influence on the entire system using an occupation rate for the bus of the sub-systems and cycle accuracy of the sub-systems.

6. The method of claim 5, wherein the sub-system having the greatest influence on the entire system is determined by selecting a sub-system having a greatest value among the values calculated by $$Pbus\_n * (1 - DurationError\_n)$$

where $Pbus\_n$ denotes a bus occupation rate of an $n^{th}$ sub-system, and $DurationError\_n$ denotes an error rate of average duration of the $n^{th}$ sub-system.

7. The method of claim 1, wherein the first and second request information is a signal generated for an address phase between each of the sub-systems and the slave model, and the first and second response information is a signal generated for a data phase between each of the sub-system and the slave model.

8. An apparatus for performing verification on a Transaction Level (TL) model having at least two abstraction levels in simulation modeling for design of a System-on-Chip (SoC), the apparatus comprising:

a Register Transfer Level (RTL) waveform reader for reading an RTL waveform indicating a simulation result on an RTL model, and outputting first request information of at least two sub-systems modeled as the RTL model during SoC design, and first response information output from first slave models that have received the first request information;

a TL waveform reader for reading and outputting, from a TL waveform indicating a simulation result on the TL model, second request information of at least two sub-systems modeled as the TL model, and second response information output from second slave models that have received second request information;

a sub-system divider for dividing the first and second request information and the first and second response information output from the RTL waveform reader and the TL waveform reader separately for each of the sub-system, using bus mastering information related to a right to access a slave model over a bus by the sub-systems; and an equivalence and data inconsistency comparator for comparing the divided first and second request information and the divided first and second response information separately for each of the sub-systems, and comparing the divided first and second request information with each other separately for sub-systems of the RTL model and sub-system of the TL model, and comparing the divided first and second response information with each other separately for the sub-systems of the RTL model and the sub-system of the TL model, thereby verifying a modeling result on the TL model.

9. The apparatus of claim 8, further comprising:

a TL protocol analyzer for storing, in a TL First Input First Output (FIFO) buffer, the second request information and the second response information divided separately for the sub-systems modeled as the TL model in the sub-system divider; and an RTL protocol analyzer for storing, in an RTL FIFO buffer, the first request information and the first response information divided separately for the sub-systems modeled as the RTL model in the sub-system divider.

10. The apparatus of claim 8, wherein the equivalence and data inconsistency comparator reports an equivalence error as the modeling result, if the first request information and the second request information are equal to each other, the first response information and the second response information are different from each other, and the slave model is a memory of a non-shared region.

11. The apparatus of claim 8, wherein the equivalence and data inconsistency comparator reports an occurrence of a data inconsistency situation as the modeling result, if a type of the first and second request information is data access, the first request information and the second request information are equal to each other for each sub-system, the first response information and the second response information are different from each other for each sub-system, and the slave model is a memory of a shared region.

12. The apparatus of claim 8, wherein the bus mastering information is bus grant information.

13. The apparatus of claim 8, further comprising:

a cycle accuracy analyzer for selecting a sub-system having a greatest influence on the entire system using an occupation rate for the bus of the sub-systems and cycle accuracy of the sub-systems.

14. The apparatus of claim 13, wherein the sub-system having the greatest influence on the entire system is determined by selecting a sub-system having a greatest value among the values calculated by $$Pbus\_n * (1 - DurationError\_n)$$

where Pbus_n denotes a bus occupation rate of an $n^{th}$ sub-system, and DurationError_n denotes an error rate of average duration of the $n^{th}$ sub-system.

15. The apparatus of claim 8, wherein the first and second request information is a signal generated for an address phase between each of the sub-systems and the slave model, and the first and second response information is a signal generated for a data phase between each of the sub-system and the slave model.

* * * * *